United States Patent
Aoki et al.

(10) Patent No.: US 10,328,345 B2
(45) Date of Patent: Jun. 25, 2019

(54) VIBRATION CONTROL SYSTEM, VIBRATION CONTROL METHOD, AND NON-TRANSITORY COMPUTER-READABLE STORAGE MEDIUM WITH EXECUTABLE VIBRATION CONTROL PROGRAM STORED THEREON

(71) Applicant: NINTENDO CO., LTD., Kyoto-shi, Kyoto (JP)

(72) Inventors: Takafumi Aoki, Kyoto (JP); Kei Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 6 days.

(21) Appl. No.: 15/656,222

(22) Filed: Jul. 21, 2017

(65) Prior Publication Data

US 2018/0028910 A1 Feb. 1, 2018

(30) Foreign Application Priority Data

Jul. 26, 2016 (JP) .................................. 2016-146079
Jan. 12, 2017 (JP) .................................. 2017-003243

(51) Int. Cl.
*A63F 13/285* (2014.01)
*A63F 13/235* (2014.01)
(Continued)

(52) U.S. Cl.
CPC .......... *A63F 13/285* (2014.09); *A63F 13/235* (2014.09); *A63F 13/24* (2014.09); *A63F 13/50* (2014.09); *A63F 13/92* (2014.09)

(58) Field of Classification Search
CPC .................................................. A63F 13/285
See application file for complete search history.

(56) References Cited

U.S. PATENT DOCUMENTS

2003/0090460 A1* 5/2003 Schena .................. A63F 13/06
345/156
2006/0046843 A1 3/2006 Nakajima
(Continued)

FOREIGN PATENT DOCUMENTS

EP 1 057 504 A2 12/2000
JP 2006-068210 3/2006
(Continued)

OTHER PUBLICATIONS

Aoki, et al., U.S. Appl. No. 15/656,240, filed Jul. 21, 2017 (70 pages).

*Primary Examiner* — Jay Trent Liddle
(74) *Attorney, Agent, or Firm* — Nixon & Vanderhye PC

(57) ABSTRACT

A vibration control system includes a first vibration command generation module that generates first vibration data defined by a combination of a first frequency and a first amplitude, a second vibration command generation module that generates second vibration data defined by a combination of a second frequency and a second amplitude, a vibration data synthesis module that outputs third vibration data defined by a combination of a third frequency and a third amplitude, and a vibration control module that causes a terminal to vibrate based on the third vibration data. The vibration data synthesis module includes a first amplitude determination module that determines the third amplitude by adding the first amplitude and the second amplitude to each other and a frequency determination module that determines a frequency within a range from the first frequency to the second frequency as the third frequency.

27 Claims, 26 Drawing Sheets

(51) Int. Cl.
  *A63F 13/24*   (2014.01)
  *A63F 13/50*   (2014.01)
  *A63F 13/92*   (2014.01)

(56) References Cited

U.S. PATENT DOCUMENTS

| | | | |
|---|---|---|---|
| 2006/0290662 A1 | 12/2006 | Houston et al. | |
| 2007/0285216 A1* | 12/2007 | Tierling | A63F 13/06 340/407.1 |
| 2011/0190058 A1* | 8/2011 | Houston | A63F 13/06 463/36 |
| 2011/0248817 A1* | 10/2011 | Houston | A63F 13/06 340/4.2 |
| 2013/0038603 A1* | 2/2013 | Bae | G06F 3/016 345/419 |
| 2013/0165226 A1* | 6/2013 | Thorner | G06F 3/011 463/37 |
| 2013/0281212 A1 | 10/2013 | Tsuchiya et al. | |
| 2017/0087458 A1* | 3/2017 | Nakagawa | A63F 13/54 |

FOREIGN PATENT DOCUMENTS

| | | |
|---|---|---|
| JP | 2013-236909 | 11/2013 |
| WO | 2012/125924 A2 | 9/2012 |

\* cited by examiner

FIG.4
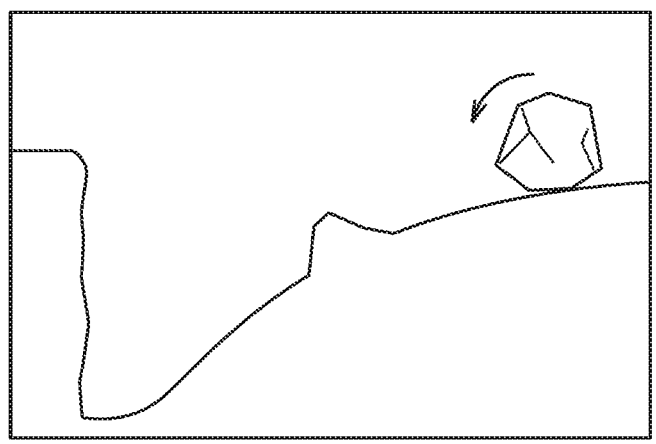
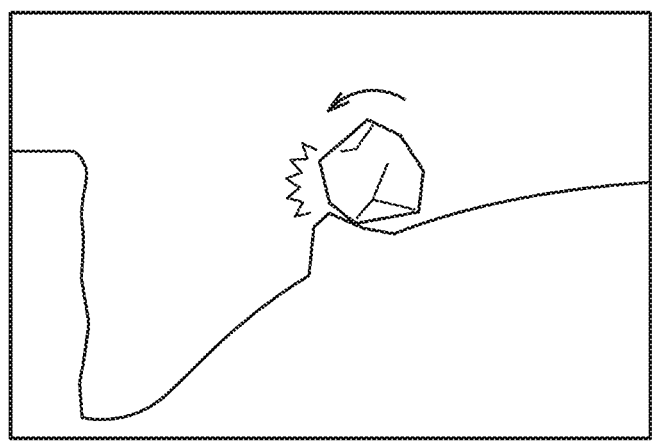

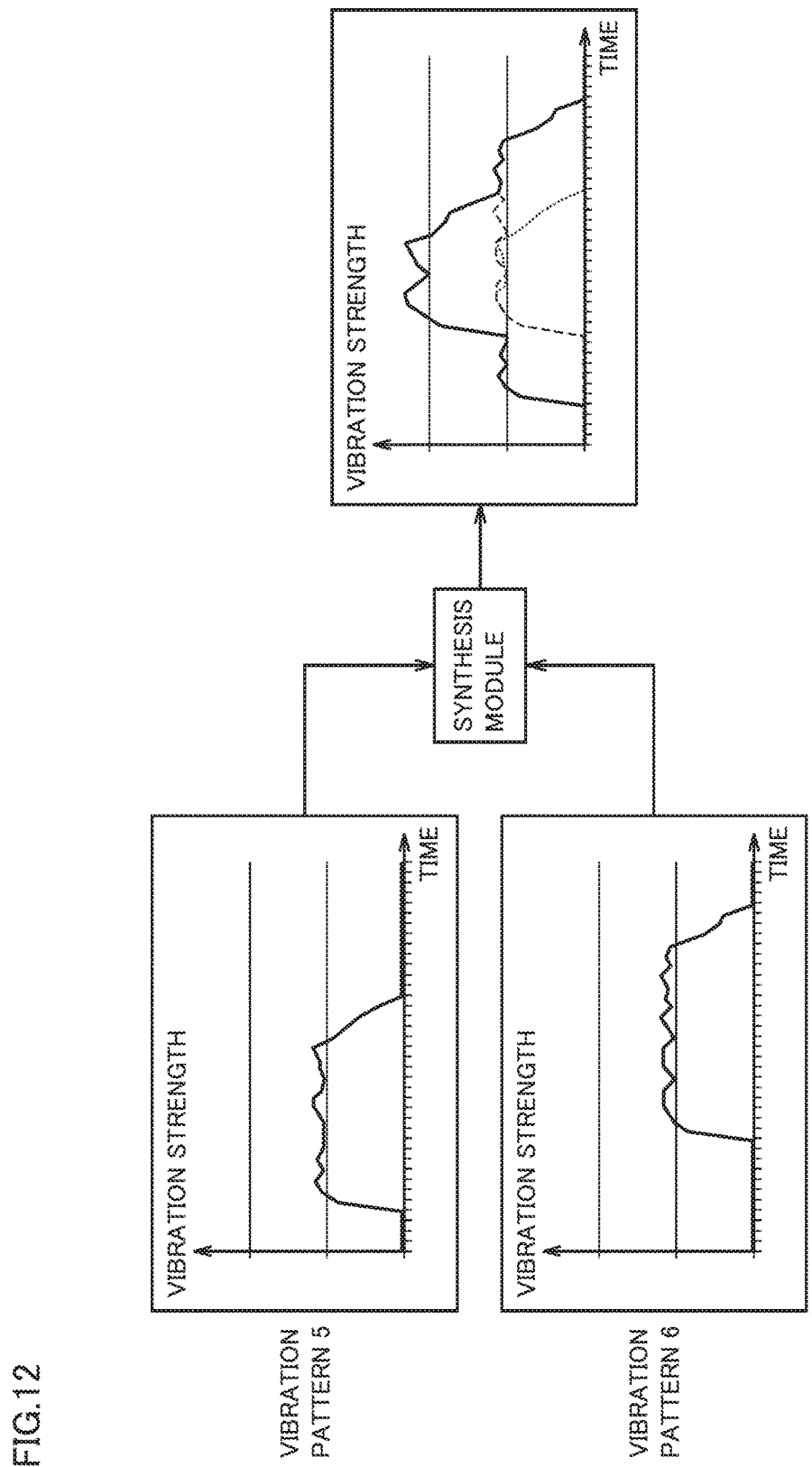

$f \leftarrow [f7, f8], \alpha \leftarrow \alpha 7 + \alpha 8$

FIG.15

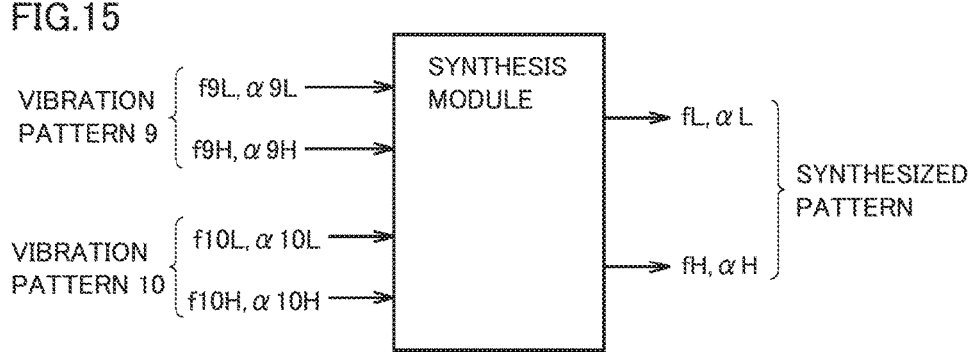

(1) $fL \leftarrow \dfrac{\alpha 9L \cdot f9L + \alpha 10L \cdot f10L}{\alpha 9L + \alpha 10L}$, $\alpha L \leftarrow \alpha 9L + \alpha 10L$ $fH \leftarrow \dfrac{\alpha 9H \cdot f9H + \alpha 10H \cdot f10H}{\alpha 9H + \alpha 10H}$, $\alpha H \leftarrow \alpha 9H + \alpha 10H$ (2) $fL \leftarrow \{f9L, f10L; \max(\alpha 9L, \alpha 10L)\}$, $\alpha L \leftarrow \alpha 9L + \alpha 10L$
$fH \leftarrow \{f9H, f10H; \max(\alpha 9H, \alpha 10H)\}$, $\alpha H \leftarrow \alpha 9H + \alpha 10H$ (3) $fL \leftarrow (f9L+f10L)/2$, $\alpha L \leftarrow \alpha 9L + \alpha 10L$
$fH \leftarrow (f9H+f10H)/2$, $\alpha H \leftarrow \alpha 9H + \alpha 10H$ $\alpha \leftarrow \max(\alpha 11, \alpha 12)$
$f \leftarrow [f11, f12]$

| Addr. | rad | sin() | |
|---|---|---|---|
| 0 | 0.00000000 | 0.000000000 | |
| 1 | 0.00153398 | 0.001533980 | |
| 2 | 0.00306796 | 0.003067957 | |
| 3 | 0.00460194 | 0.004601926 | ← (1) CURRENT COUNT VALUE |
| 4 | 0.00613592 | 0.006135885 | |
| 5 | 0.00766990 | 0.007669829 | |
| 6 | 0.00920388 | 0.009203755 | |
| 7 | 0.01073787 | 0.010737659 | |
| 8 | 0.01227185 | 0.012271538 | |
| 9 | 0.01380583 | 0.013805389 | (2) CALCULATE NEXT COUNT VALUE BASED ON DESIGNATED FREQUENCY |
| 10 | 0.01533981 | 0.015339206 | |
| 11 | 0.01687379 | 0.016872988 | |
| 12 | 0.01840777 | 0.018406730 | |
| 13 | 0.01994175 | 0.019940429 | |
| 14 | 0.02147573 | 0.021474080 | |
| 15 | 0.02300971 | 0.023007681 | |
| 16 | 0.02454369 | 0.024541229 | ← (3) NEXT COUNT VALUE → READ CORRESPONDING sin VALUE |
| 17 | 0.02607767 | 0.026074718 | |
| 18 | 0.02761165 | 0.027608146 | |
| 19 | 0.02914563 | 0.029141509 | |
| 20 | 0.03067962 | 0.030674803 | |
| 21 | 0.03221360 | 0.032208025 | |
| 22 | 0.03374758 | 0.033741172 | (4) CALCULATE COUNT VALUE AFTER NEXT BASED ON DESIGNATED FREQUENCY |
| 23 | 0.03528156 | 0.035274239 | |
| 24 | 0.03681554 | 0.036807223 | |
| 25 | 0.03834952 | 0.038340120 | |
| 26 | 0.03988350 | 0.039872928 | |
| 27 | 0.04141748 | 0.041405641 | ← (5) COUNT VALUE AFTER NEXT → READ CORRESPONDING sin VALUE |
| 28 | 0.04295146 | 0.042938257 | |
| 29 | 0.04448544 | 0.044470772 | |
| 30 | 0.04601942 | 0.046003182 | |
| 31 | 0.04755340 | 0.047535484 | |
| 32 | 0.04908739 | 0.049067674 | |
| 33 | 0.05062137 | 0.050599749 | |
| 34 | 0.05215535 | 0.052131705 | |
| 35 | 0.05368933 | 0.053663538 | |
| 36 | 0.05522331 | 0.055195244 | |
| ⋮ | ⋮ | ⋮ | |
| 4095 | 6.28165133 | −0.001533980 | | ived
VIBRATION CONTROL SYSTEM, VIBRATION CONTROL METHOD, AND NON-TRANSITORY COMPUTER-READABLE STORAGE MEDIUM WITH EXECUTABLE VIBRATION CONTROL PROGRAM STORED THEREON This nonprovisional application is based on Japanese Patent Applications Nos. 2016-146079 and 2017-003243 filed with the Japan Patent Office on Jul. 26, 2016 and Jan. 12, 2017, respectively, the entire contents of which are hereby incorporated by reference.

FIELD

The present disclosure relates to a vibration control system capable of providing vibrations to a user, a method in the vibration control system, and a non-transitory computer-readable storage medium with an executable program directed to the vibration control system stored thereon.

BACKGROUND AND SUMMARY

Game processing making use of vibrations has conventionally been proposed. A configuration capable of providing a new operational feeling because of variation in vibrations in accordance with a difference in manner of representation of a character has been disclosed. A configuration in which a vibration portion which generates vibrations based on a control signal from an information processing apparatus is arranged inside a grip portion has been disclosed.

An exemplary embodiment provides a method of enhancing a degree of freedom in providing a plurality of types of vibrations to a user.

An exemplary embodiment provides a vibration control system that includes a first vibration command generation module that generates first vibration data defined by a combination of a first frequency and a first amplitude, a second vibration command generation module that generates second vibration data defined by a combination of a second frequency and a second amplitude, a vibration data synthesis module that outputs third vibration data defined by a combination of a third frequency and a third amplitude when the first vibration data and the second vibration data are input, and a vibration control module that causes a terminal to vibrate based on the third vibration data. The vibration data synthesis module includes a first amplitude determination module that determines the third amplitude by adding the first amplitude and the second amplitude to each other and a frequency determination module that determines a frequency within a range from the first frequency to the second frequency as the third frequency.

According to the present embodiment, when two pieces of vibration data are input, an amplitude is determined by adding amplitudes of respective pieces of vibration data and a value within a range defined by frequencies of the vibration data is adopted as a frequency. By vibrating a terminal with the amplitude and the frequency determined in such a procedure, a sensory impulse resulting from two types of vibrations expressed by two input pieces of vibration data can effectively be provided to a user.

According to one embodiment, the frequency determination module may determine the third frequency from the first frequency and the second frequency based on relation between the first amplitude and the second amplitude.

According to the present embodiment, such adjustment that influence by a frequency of any vibration data is to more strongly be reflected can be made based on relation between amplitudes of input vibration data, and two types of vibrations expressed by two input pieces of vibration data can effectively be synthesized with each other.

According to one embodiment, the frequency determination module may determine as the third frequency, an arithmetic mean of the first frequency and the second frequency as being weighted by a weight coefficient dependent on the first amplitude and the second amplitude.

According to the present embodiment, by using a weight coefficient dependent on amplitudes of input vibration data, such reflection that influence by a frequency of any vibration data is to more strongly be reflected can readily be given, and two types of vibrations expressed by two input pieces of vibration data can effectively be synthesized with each other. Since processing for calculating an arithmetic mean is relatively small in amount of operation, a processing speed can be increased.

According to one embodiment, the frequency determination module may determine as the third frequency, a geometric mean of the first frequency and the second frequency as being weighted by a weight coefficient dependent on the first amplitude and the second amplitude.

According to the present embodiment, by using a weight coefficient dependent on amplitudes of input vibration data, such reflection that influence by a frequency of any vibration data is to more strongly be reflected can readily be given and two types of vibrations expressed by two input pieces of vibration data can effectively be synthesized with each other. Taking into account kinetic energy generated by vibrations, a frequency is preferably subjected to exponentiation processing or logarithmic processing and synthesis processing with a physical phenomenon being further reflected can be performed by adopting processing for calculating a geometric mean.

According to one embodiment, the frequency determination module may determine a frequency of vibration data greater in amplitude of the first vibration data and the second vibration data as the third frequency.

According to the present embodiment, vibrations which seem to affect a user more of two types of vibrations expressed by two input pieces of vibration data can preferentially be output. Since one of two input pieces of vibration data is selected and output as it is, an amount of operation can be reduced.

According to one embodiment, the frequency determination module may determine a median between the first frequency and the second frequency as the third frequency.

According to the present embodiment, since a median of frequencies of two types of vibrations expressed by two input pieces of vibration data is determined as a frequency of synthesized vibrations, a sensory impulse resulting from vibrations expressed by the two pieces of vibration data can effectively be provided to the user. Since it is only necessary to calculate a median of two frequencies, an amount of operation can be reduced.

According to one embodiment, the frequency determination module may determine a geometric mean of the first frequency and the second frequency as the third frequency.

Taking into account kinetic energy generated by vibrations, a frequency is preferably subjected to exponentiation processing or logarithmic processing. According to the present embodiment, synthesis processing with a physical phenomenon being further reflected can be performed by adopting processing for calculating a geometric mean.

According to one embodiment, the vibration data synthesis module may further include a second amplitude determination module that determines one of the first amplitude and the second amplitude as the third amplitude and a selection module that activates one of the first amplitude determination module and the second amplitude determination module in response to a selection instruction.

According to the present embodiment, both of a value on which influence by both of two input pieces of vibration data are reflected and a value on which influence only by one piece of vibration data is reflected can selectively be used as an amplitude of vibrations synthesized from the two input pieces of vibration data. With such a selection function, a developer of an application can provide a sensory impulse in accordance with a scene of a produced application to a user.

According to one embodiment, the first and second vibration command generation modules may update vibration data in accordance with change per unit period in vibration waveform with which the terminal is to be vibrated.

According to the present embodiment, various vibrations of which strength is varied over time can be expressed.

According to one embodiment, the first vibration command generation module may further generate fourth vibration data defined by a combination of a fourth frequency and a fourth amplitude in addition to the first vibration data, the second vibration command generation module may further generate fifth vibration data defined by a combination of a fifth frequency and a fifth amplitude in addition to the second vibration data, and the vibration data synthesis module may further output sixth vibration data defined by a combination of a sixth frequency and a sixth amplitude in addition to the third vibration data when the fourth vibration data and the fifth vibration data are input in addition to the first vibration data and the second vibration data.

According to the present embodiment, a target vibration pattern can be defined by a plurality of pieces of vibration data and hence a sensory impulse through vibrations which is more close to real can be provided to a user.

According to one embodiment, the vibration data synthesis module may output the third vibration data from two pieces of vibration data of the first vibration data to the fourth vibration data and output the sixth vibration data from two remaining pieces of vibration data in accordance with a frequency of input vibration data.

According to the present embodiment, when a number of pieces of vibration data are input, vibration data close to each other in frequency can be synthesized with each other so that vibrations expressed by input vibration data are synthesized as accurately as possible and the vibrations can be provided to a user as a sensory impulse.

According to one embodiment, the vibration data synthesis module may be configured to accept as an input, vibration data output from another vibration data synthesis module.

According to the present embodiment, a flexible processing environment in conformity with an intention of a developer can be provided in an application in which one synthesized pattern should be generated from a number of pieces of vibration data.

According to one embodiment, the vibration control system may further include a game progress module that executes a game application, and the first and second vibration command generation modules may generate vibration data in response to an event generated by the game progress module.

According to the present embodiment, a sensory impulse through vibrations can be provided to a user in association with an event which occurs as a result of some kind of an operation by the user in a game application and a sense of realism of the game application can be enhanced.

According to one embodiment, the first vibration command generation module may generate the first vibration data in response to a first event generated by the game progress module and the second vibration command generation module may generate the second vibration data in response to a second event different from the first event.

According to the present embodiment, for example, in application processing such as game processing, vibrations different in property from each other can be generated in response to different operations by a user.

According to one embodiment, the game progress module may generate the event in response to an operation by a user.

According to the present embodiment, a sensory impulse through vibrations can be provided to a user in association with some kind of an operation by the user in a game application and hence an operational feeling in the game application can be improved.

According to one embodiment, the first vibration data may exhibit weak and continual vibrations and the second vibration data may exhibit strong and short vibrations.

According to the present embodiment, for example, vibrations corresponding to a background environment of a game application can be expressed with first vibration data and vibrations corresponding to an operation of a character can be expressed with second vibration data. A user can perceive any of such vibrations different in type.

According to one embodiment, the terminal may include a vibrator having a plurality of resonance frequencies and the first frequency and the second frequency may be set in accordance with the resonance frequency of the vibrator.

According to the present embodiment, vibrations can efficiently be generated from a vibrator by bringing vibrations in correspondence with a resonance frequency of the vibrator.

An exemplary embodiment provides a vibration control method that includes generating first vibration data defined by a combination of a first frequency and a first amplitude, generating second vibration data defined by a combination of a second frequency and a second amplitude, outputting third vibration data defined by a combination of a third frequency and a third amplitude when the first vibration data and the second vibration data are input, and causing a terminal to vibrate based on the third vibration data. The outputting third vibration data includes determining the third amplitude by adding the first amplitude and the second amplitude to each other and determining a frequency within a range from the first frequency to the second frequency as the third frequency.

An exemplary embodiment provides a non-transitory computer-readable storage medium with an executable vibration control program which causes a computer of a terminal to perform the vibration control method described above.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIGS. 4 and 5 show exemplary illustrative non-limiting drawings illustrating processing for controlling a vibration portion in the game system according to the present embodiment.

FIG. 12 shows an exemplary illustrative non-limiting drawing illustrating a method of synthesizing vibration patterns in accordance with an addition scheme according to the present embodiment.

FIG. 15 shows an exemplary illustrative non-limiting drawing illustrating mounting of another synthesis method in accordance with the addition scheme according to the present embodiment.

FIG. 23 shows an exemplary illustrative non-limiting drawing illustrating processing for generating a drive signal with a reference table in the game system according to the present embodiment.

DETAILED DESCRIPTION OF NON-LIMITING EXAMPLE EMBODIMENTS

Figure 1:
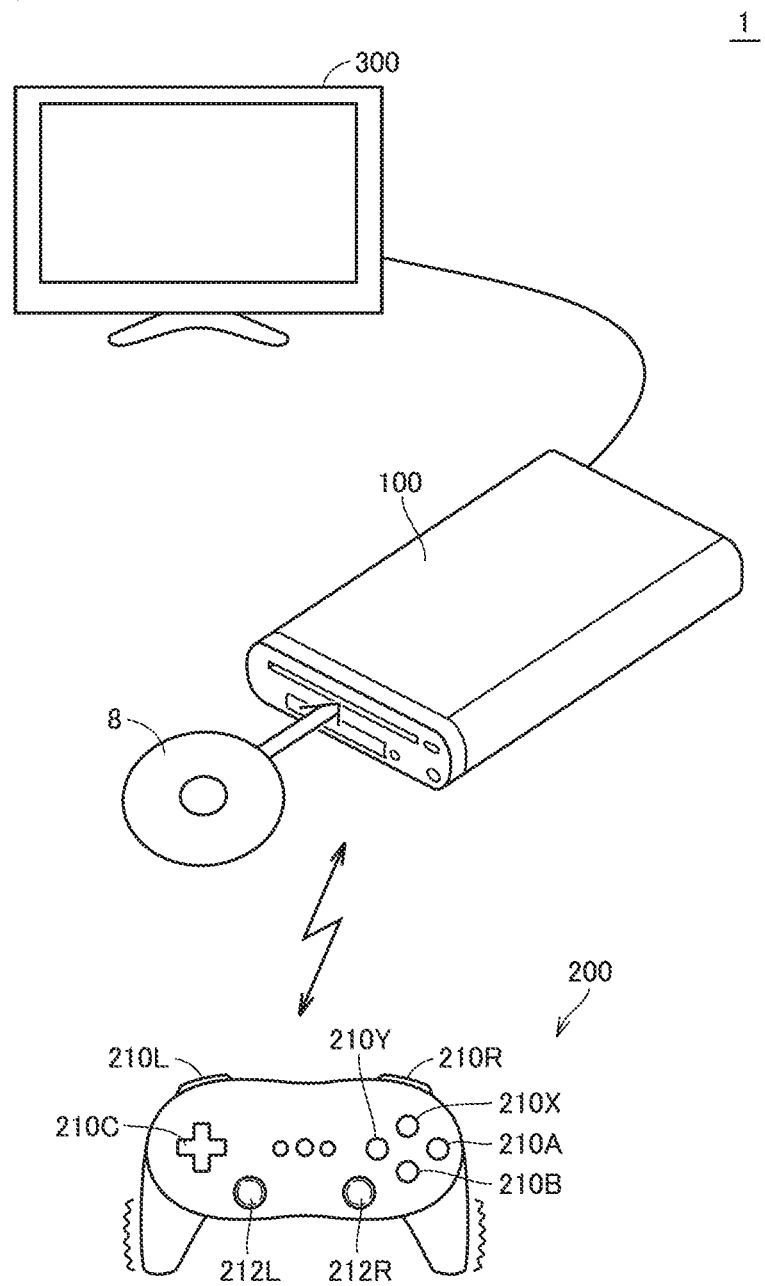
FIG. 1 shows an exemplary illustrative non-limiting drawing illustrating a form of use of a game system according to the present embodiment.

The present embodiment will be described in detail with reference to the drawings. The same or corresponding elements in the drawings have the same reference characters allotted and description thereof will not be repeated.

A configuration including a stationary game device and a controller terminal which vibrates is exemplified as one example of a vibration control system according to the present embodiment. The vibration control system in the subject invention is applied not only to a stationary game system but also to execution of a game with a portable game device or a smartphone being used as a game device. In this case, the portable game device or the smartphone itself can be a "terminal" which vibrates. The vibration control system is applicable to any configuration so long as the system includes an apparatus which generates vibrations.

[A. Apparatus Configuration]

An apparatus configuration involved with a game system according to the present embodiment will initially be described.

(a1: Overall Game System)

One example of a form of use of a game system 1 according to the present embodiment will be described with reference to FIG. 1. Game system 1 includes a processing apparatus 100 and a controller 200 which can wirelessly communicate with processing apparatus 100. Though an example in which one controller 200 wirelessly communicates with processing apparatus 100 is shown for the sake of convenience of description, a plurality of controllers 200 may wirelessly communicate with processing apparatus 100 and a controller of another type in addition to controller 200 may communicate with processing apparatus 100. Radio communication or wired communication may be adopted as means for communication between processing apparatus 100 and a controller. Instead of a dedicated controller 200, a portable game device or a smartphone may be used as a controller.

A display 300 such as a home television receiver is connected to processing apparatus 100. Processing apparatus 100 is an entity which performs various types of processing in game system 1 and it executes an application program and outputs images (which may include still images and moving images) or sound generated as a result of execution to display 300. A menu screen mounted in advance on processing apparatus 100 is also output to display 300. An application program executed in processing apparatus 100 is distributed through a removable storage medium or through the Internet. In the present embodiment, an application program is obtained from an optical recording medium 8 such as a digital versatile disk (DVD).

(a2: Processing Apparatus)

Figure 2:
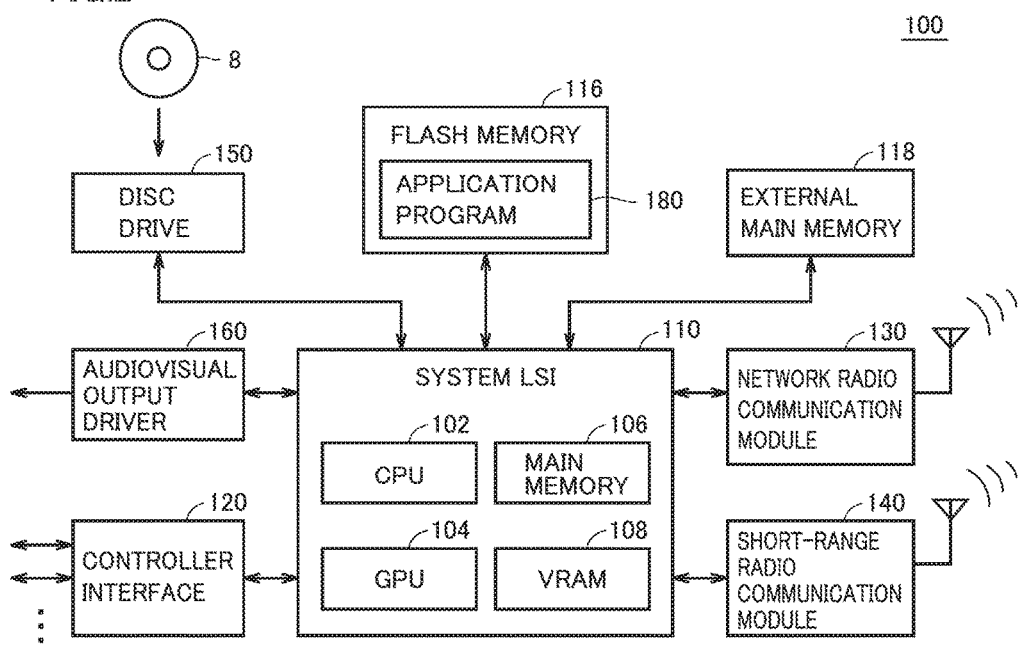
FIG. 2 shows an exemplary illustrative non-limiting drawing illustrating a configuration of a processing apparatus included in the game system in the present embodiment.

A configuration example of processing apparatus 100 included in game system 1 in the present embodiment will be described with reference to FIG. 2. Processing apparatus 100 represents a computer of one type and it is a computer including a system large scale integration (LSI) 110, a flash memory 116, an external memory 118, a controller interface 120, a network radio communication module 130, a short-range radio communication module 140, a disc drive 150, and an audiovisual output driver 160.

System LSI 110 is a processing engine in processing apparatus 100 and includes a central processing unit (CPU) 102, a graphical processing unit (GPU) 104, a main memory 106, and a video random access memory (VRAM) 108. CPU 102 executes a system program or an application program. GPU 104 performs processing mainly involved with representation. Main memory 106 functions as a working memory which holds temporary data necessary for execution of a program by CPU 102. VRAM 108 functions as a working memory for showing an image generated in processing by GPU 104. All components included in system LSI 110 do not have to be mounted on a single LSI and some of them may be mounted outside the LSI.

Flash memory 116 is accessible from system LSI 110 and holds a system program or an application program in a non-volatile manner. For example, flash memory 116 stores an application program 180 according to the present embodiment. External memory 118 functions as a working memory in coordination with main memory 106 in system LSI 110.

Controller interface 120 includes a connector and a circuit for wired connection of a not-shown controller. Controller interface 120 exchanges a signal (operation information) representing an operation by a user onto the controller with the controller connected through a wire.

Network radio communication module 130 includes various circuits for radio communication with a not-shown access point. Processing apparatus 100 is connected to the Internet through network radio communication module 130. Examples of radio communication schemes adopted by network radio communication module 130 include wireless LAN in conformity with IEEE 802.11n standards and mobile communication such as long term evolution (LTE) and WiMAX®.

Short-range radio communication module 140 includes various circuits for radio communication with controller 200 (FIG. 1). Processing apparatus 100 receives operation information from controller 200 through short-range radio communication module 140. Examples of radio communication schemes adopted by short-range radio communication module 140 include a scheme in conformity with Bluetooth® standards and infrared communication in conformity with infrared data association (IRDA) standards.

A configuration in accordance with each communication scheme is adopted for the communication module. A configuration which is physical integration of the entirety or a part of the two communication modules can also be adopted.

Disc drive 150 reads data from optical recording medium 8 and outputs the read data to system LSI 110. Audiovisual output driver 160 outputs a video signal and an audio signal output from system LSI 110 to display 300.

(a3: Controller)

A configuration example of controller 200 included in game system 1 in the present embodiment will be described with reference to FIG. 3. Controller 200 includes a controller control unit 202, buttons 210, analog sticks 212L and 212R, a vibration portion 220, sensors 230, and a short-range radio communication module 240.

Controller control unit 202 is a processing engine in controller 200 and implemented, for example, by a microcomputer. Controller control unit 202 collects signals (operation information) representing an operation by a user onto buttons 210 and/or analog sticks 212L and 212R and a result of detection by sensors 230 and transmits the signals and the result to processing apparatus 100 through short-range radio communication module 240. Controller control unit 202 drives vibration portion 220 upon receiving a command relating to vibrations from processing apparatus 100 (which is hereinafter also referred to as a "vibration command").

Buttons 210 include an A button 210A, a B button 210B, an X button 210X, a Y button 210Y, an L button 210L, an R button 210R, and a cross-shaped button 210C. Each button outputs a signal resulting from a pressing operation by a user to controller control unit 202.

Analog sticks 212L and 212R output operation information including a direction and magnitude in accordance with a direction and an amount of tilt of a stick member and whether or not the stick member has been pressed down to processing apparatus 100.

Vibration portion 220 provides a sensory impulse through vibrations to a user who holds controller 200. Specifically, vibration portion 220 includes an amplifier 212 and a vibrator 214. Amplifier 212 amplifies a vibration command from controller control unit 202 and drives vibrator 214 with the amplified vibration command. In the present embodiment, vibrator 214 having a plurality of resonance frequencies may be adopted. By adopting vibrator 214 having such a plurality of resonance frequencies, a vibratory stimulus can more efficiently be provided to a user through excitation at a frequency in the vicinity of a resonance frequency and various vibratory stimuli can be provided to the user.

Sensors 230 detect information on a motion and/or an attitude of controller 200 and output a result of detection to processing apparatus 100. In the present embodiment, specifically, sensors 230 include an acceleration sensor 232 and an angular speed sensor 234. Acceleration sensor 232 detects magnitude of a linear acceleration along one or more axial directions (typically, directions of three axes orthogonal to one another). Angular speed sensor 234 detects an angular speed around one or more axes (typically, around three axes orthogonal to one another). Any one or both of the acceleration sensor and the angular speed sensor may be mounted on the controller as the sensors.

Short-range radio communication module 240 includes various circuits for radio communication with processing apparatus 100. Controller control unit 202 exchanges data with processing apparatus 100 through short-range radio communication module 240. A radio communication scheme adopted by short-range radio communication module 240 may be adapted to a radio communication scheme adopted by short-range radio communication module 140 of processing apparatus 100.

[B. Overview]

Game system 1 according to the present embodiment has a function to effectively provide a sensory impulse through vibrations in accordance with progress of game processing to a user. A function to provide a sensory impulse through vibrations will be described below.

One example of processing for controlling vibration portion 220 in game system 1 according to the present embodiment will be described with reference to FIGS. 4 and 5. For example, such an application as providing a sensory impulse through two types of vibrations to a user in accordance with progress of game processing is assumed. In such a case, a vibration source 1 and a vibration source 2 which generate vibrations are prepared. Vibration waveforms generated by respective vibration sources are synthesized to vibrate vibration portion 220 of controller 200.

Each of the vibration sources corresponds to a function to output vibration data for generating vibrations, and may be mounted, for example, as a program for calculating a parameter defining one or more pieces of vibration data. Vibration source 1 corresponds to a first vibration command generation function which generates first vibration data defined by a combination of a first frequency and a first amplitude and vibration source 2 corresponds to a second vibration command generation function which generates second vibration data defined by a combination of a second frequency and a second amplitude. Vibration source 1 and vibration source 2 may be implemented on the same program or implemented by different programs.

For example, as shown in FIG. 4, such game processing that a rock object rolls down a slope and collides against an obstacle on the way in a game space is assumed. In such game processing, vibrations generated in response to an event of the rock rolling down the slope (expressed by vibration data generated by vibration source 1) and vibrations generated in response to an event of collision against the obstacle (expressed by vibration data generated by vibration source 2) are synthesized to actually vibrate controller 200.

Vibrations corresponding to vibration data generated by vibration source 1 are assumed as vibrations of which strength is low but is maintained. Vibrations corresponding to vibration data generated by vibration source 2 are assumed as vibrations of which maximum value (peak value) of strength is great and variation in strength over time is abrupt. FIG. 5 shows one example of variation in vibration strength over time when two vibrations are synthesized with each other. The "vibration strength" herein means magnitude of a sensory impulse through vibrations provided to a user and it basically corresponds to magnitude of maximum displacement of a vibrator.

In game system 1 according to the present embodiment, one or more vibration sources are prepared and vibration data generated by the vibration sources in response to an event are synthesized to vibrate controller 200 with the synthesized vibration data. When vibration strengths corresponding to respective pieces of vibration data are simply added and output, strength of vibrations resulting from synthesis may exceed vibration strength which can be provided in controller 200 (that is, a maximum value of allowable displacement of the vibrator). In a range beyond such a maximum, variation in vibration strength cannot be expressed and consequently an expected vibratory stimulus cannot be provided to a user.

In order to avoid such a situation, such adjustment should be made that even though vibrations expressed by vibration data from prepared vibration sources are added, a result of addition is not excessively great. Since each vibration source outputs vibration data in response to a corresponding event, it is difficult to exactly expect in advance how vibrations are combined in actual game processing.

In order to address such a problem, by using a synthesis method according to the present embodiment, an application developer can set a vibration source without taking into account vibrations resulting from addition each time, and an appropriate vibratory stimulus in accordance with an event can be provided to a user.

Game system 1 according to the present embodiment provides a function to appropriately synthesize vibration data from a plurality of vibration sources and provide an appropriate vibratory stimulus in accordance with progress of a game to a user based on a result of synthesis.

[C. Method of Designating Vibration Waveform]

A method of designating a vibration waveform in game system 1 according to the present embodiment will initially be described. Each vibration waveform represents displacement at each time of vibrator 214 (see FIG. 3) of vibration portion 220. A method of designating a vibration waveform typically includes designation with a time domain and designation with a frequency domain. Each designation method will be described below.

(c1: Designation with Time Domain)

Figure 6:
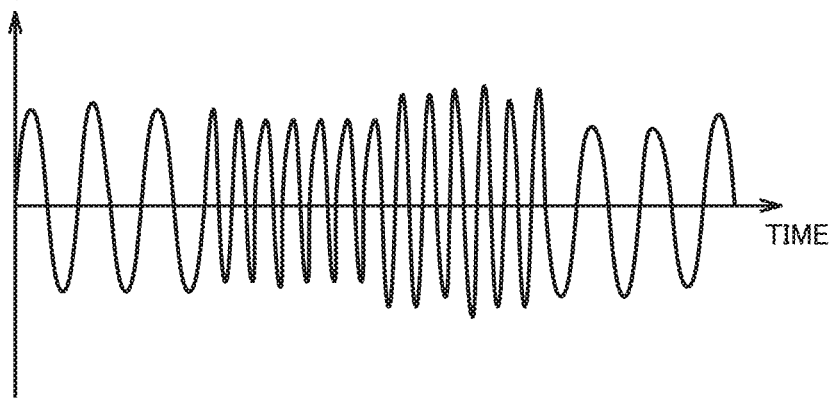
FIG. 6 shows an exemplary illustrative non-limiting drawing illustrating a method of designating a vibration waveform with a time domain in the game system according to the present embodiment.

A method of designating a vibration waveform with a time domain in game system 1 according to the present embodiment will be described with reference to FIG. 6. When any vibration waveform is designated, change over time in value (for example, a voltage value) corresponding to displacement (an amount of movement from a reference position of a vibration motor or a vibrator) every sampling period (for example, several ten μsecs. to several thousand μsecs.) of the vibration waveform can be designated, for example, as a data aggregate (A1, A2, A3, . . . , and An). By varying displacement over time based on the data aggregate, target vibrations of a vibration waveform can be provided. The data aggregate corresponds to vibration data representing a designated vibration waveform of vibrations.

(c2: Designation with Frequency Domain)

Figure 7:
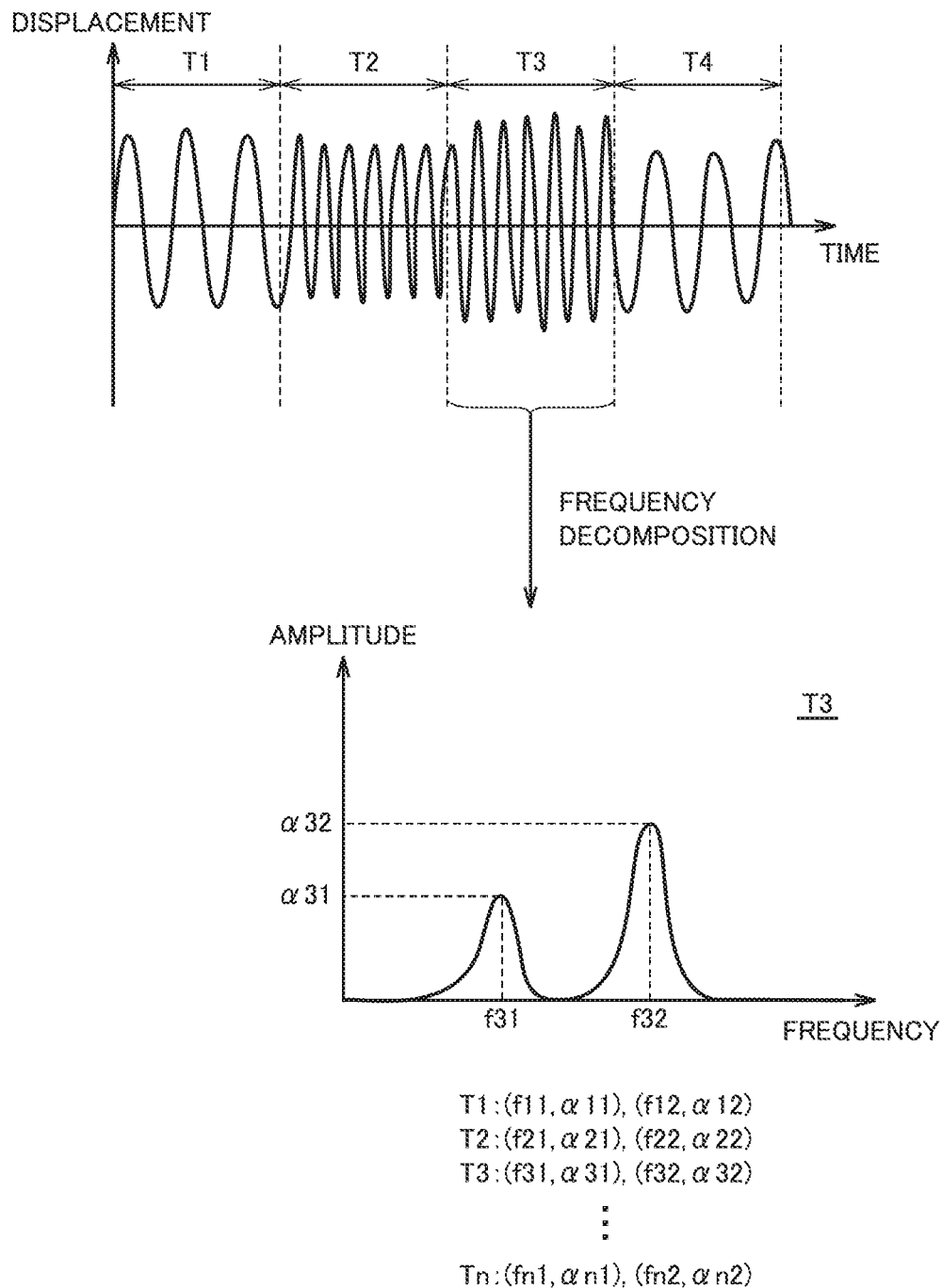
FIG. 7 shows an exemplary illustrative non-limiting drawing illustrating a method of designating a vibration waveform with a frequency domain in the game system according to the present embodiment.

A method of designating a vibration waveform with a frequency domain in game system 1 according to the present embodiment will be described with reference to FIG. 7. When any vibration waveform is designated, the vibration waveform is divided into unit periods (that is, sampling sections) T1, T2, T3, . . . of a prescribed duration (for example, 5 msecs. to several ten msecs.) and a vibration waveform in each unit period is subjected to frequency decomposition. A main component in a combination of a frequency and an amplitude included in a result of frequency decomposition can be extracted and defined as a value representing each unit period.

By adopting such a technique, a target vibration waveform can be designated as data aggregates {(f11, α11), (f12, α12)}, {(f21, α21), (f22, α22)}, {(f31, α31), (f32, α32)}, . . . , and {(fn1, αn1), (fn2, αn2)} each defined by a combination of a frequency f and an amplitude α. Each combination of frequency f and amplitude α represents one piece of vibration data. Target vibrations can be provided by generating a vibration waveform based on a frequency and an amplitude included in the data aggregate for each sampling period. In the example shown in FIG. 7, two main components included in a result of frequency decomposition are extracted and these two main components express a vibration waveform for each corresponding unit period. Substantially intended vibrations can be provided by adopting a main component of a plurality of (two in the example shown in FIG. 7) characteristic frequencies.

Though an example in which a vibration waveform representing target vibrations is designated by one combination or two combinations of a frequency and an amplitude has been exemplified, limitation thereto is not intended and more combinations of a frequency and an amplitude may be used to designate a vibration waveform. Instead of determining a frequency and an amplitude by subjecting a vibration waveform to frequency decomposition, a frequency and an amplitude may directly be designated to define a vibration waveform as one piece or a plurality of pieces of vibration data defined by the designated frequency and amplitude.

In game system 1 according to the present embodiment, vibrator 214 arranged in controller 200 has two resonance frequencies, and hence two main components may be used in accordance with the two resonance frequencies. Each main component may be defined by a low frequency component and a high frequency component in correspondence with resonance frequencies of vibrator 214, and in this case, may be defined by a set of a frequency and an amplitude for designating a low frequency component and a set of a frequency and an amplitude for designating a high frequency component. A frequency of a low frequency component and a frequency of a high frequency component defining the first vibration data and a frequency of a low frequency component and a frequency of a high frequency component defining the second vibration data may be set in accordance with any of the plurality of resonance frequencies of vibrator 214.

For the sake of convenience of description, a method of designating vibration data representing vibrations with a frequency domain will mainly be described below. In the description below, processing in an example where vibration data (first vibration data and second vibration data) for vibrating a terminal (controller 200 in the example below) is defined by a combination of a frequency and an amplitude will be described.

Vibration data defines a drive signal for driving vibrator 214 of vibration portion 220. In the description below, a vibratory signal to be provided is also referred to as a "vibration pattern" or a "synthesized pattern." The "vibration pattern" and the "synthesized pattern" may be defined by a parameter in a frequency domain or by a parameter in a time domain. Processing in an example in which one combination or a plurality of combinations of parameters in a frequency domain, that is, a frequency and an amplitude, is/are used will be described below. The "vibration pattern" and the "synthesized pattern" are terms which may encompass a substance of vibrations defined by "vibration data" for generating vibrations. For the sake of convenience of description, a "vibration pattern" (output vibration pattern) generated from a plurality of "vibration patterns" (input vibration patterns) may be referred to as a "synthesized pattern" for distinction.

Processing described below is obviously also similarly applicable to a method of defining vibration data representing vibrations with a time domain.

[D. Method of Synthesizing Vibration Patterns]

A method of synthesizing vibration patterns in game system 1 according to the present embodiment will now be described. A method of synthesizing vibration patterns typically includes a selection scheme and an addition scheme. Each synthesis method will be described below.

(d1: Selection Scheme; Single Piece of Vibration Data)

In the selection scheme of the method of synthesizing vibration patterns according to the present embodiment, any one of a plurality of input vibration patterns is selected and output every prescribed period. In one embodiment, any one of two vibration patterns is selectively output every prescribed period based on an amplitude represented by one vibration pattern and the other amplitude represented by the other vibration pattern. More specifically, when first vibration data (vibration pattern) and second vibration data (vibration pattern) generated by vibration sources are input, vibration data greater in amplitude is selected every prescribed period based on an amplitude of the first vibration data and an amplitude of the second vibration data.

The method of synthesizing vibration patterns in accordance with the selection scheme according to the present embodiment will be described with reference to FIG. 8. For example, a vibration pattern 1 and a vibration pattern 2 are input. Vibration pattern 1 expressed by the first vibration data designates weak and continual vibrations so to speak and vibration pattern 2 expressed by the second vibration data designates strong and short vibrations so to speak.

A synthesis module determines which vibration pattern is greater in amplitude every prescribed period (for example, 5 msecs. to several ten msecs.) and selects and outputs a vibration pattern greater in amplitude. A synthesized pattern is generated with signals output every prescribed period. Typically, the synthesis module compares input vibration patterns at timing of start of each period and determines a vibration pattern to be output. Then, determination of the output vibration pattern is maintained until a next period comes. In this case, a part of a vibration pattern which is not selected is discarded.

The "prescribed period" here means a period in which various types of processing including determination processing as described above are performed and a length thereof and timing to start and quit the period may be set in association with vibration data. When input vibration data is defined every predetermined sampling period, the prescribed period may be set to a period as long as the sampling period or an integer multiple of the sampling period.

Figure 8:
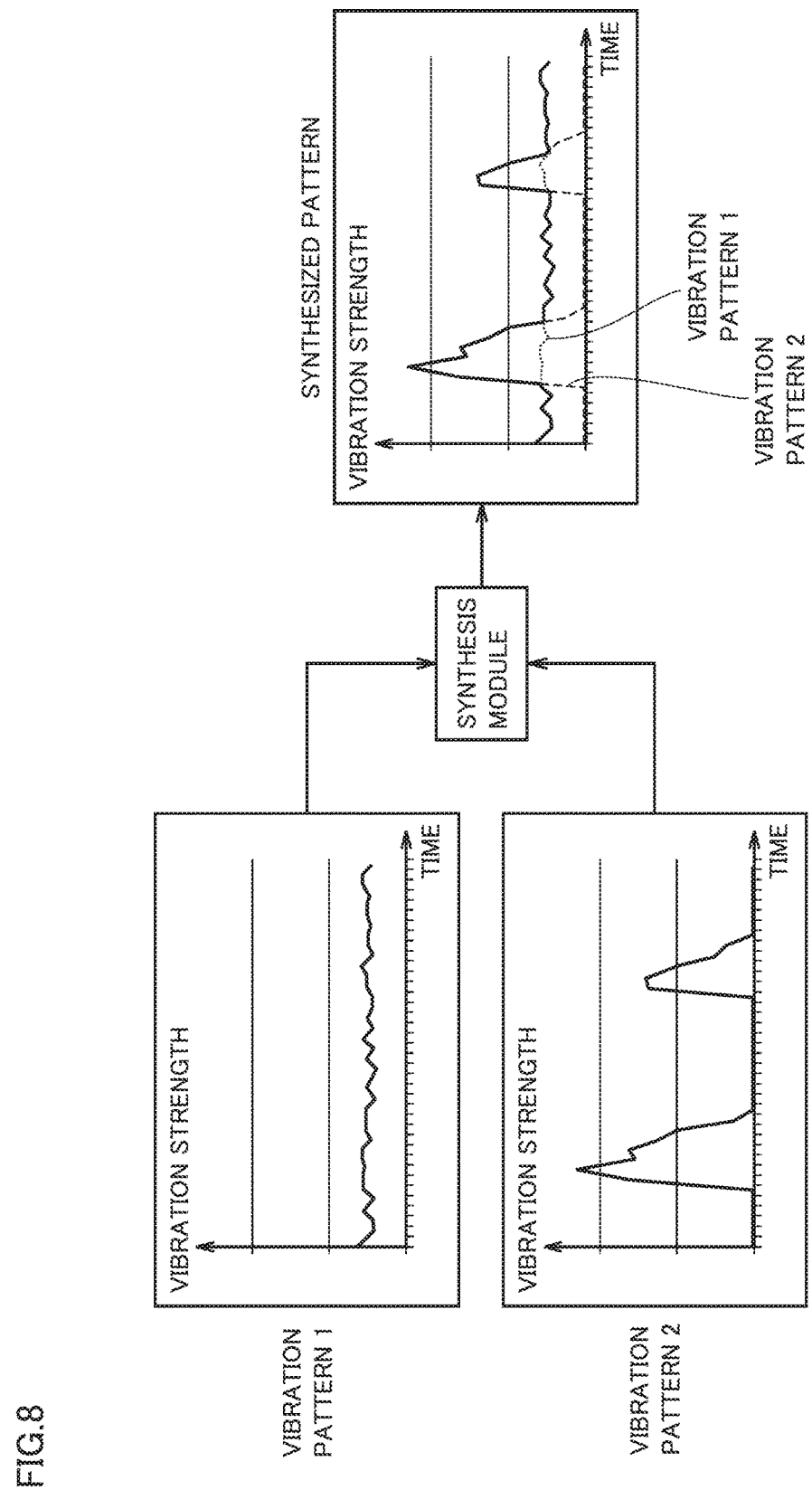
FIG. 8 shows an exemplary illustrative non-limiting drawing illustrating a method of synthesizing vibration patterns in accordance with a selection scheme according to the present embodiment.

By adopting such a selection scheme, a user can perceive strong and short vibrations contained in weak and continual vibrations designated by vibration pattern 1 in FIG. 8.

Figure 9:
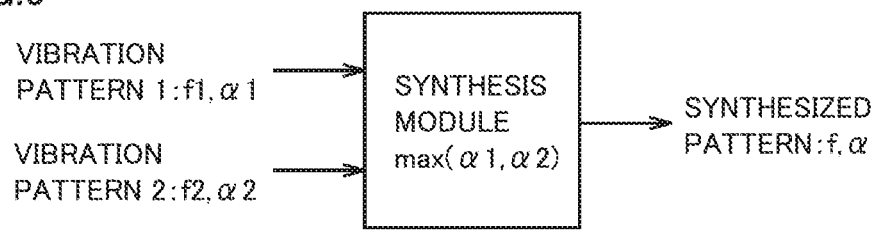
FIG. 9 shows an exemplary illustrative non-limiting drawing illustrating mounting of a synthesis method in accordance with the selection scheme according to the present embodiment.

A mount example of the synthesis method in accordance with the selection scheme according to the present embodiment will be described with reference to FIG. 9. A mount example in which each of vibration patterns 1 and 2 is designated by one combination of a frequency and an amplitude is shown. It is assumed that a frequency f1 and an amplitude α1 representing vibration pattern 1 and a frequency f2 and an amplitude α2 representing vibration pattern 2 are updated every prescribed period.

The synthesis module outputs frequency f and amplitude α (third vibration data) representing a synthesized pattern when frequency f1 and amplitude α1 (first vibration data) of vibration pattern 1 and frequency f2 and amplitude α2 (second vibration data) of vibration pattern 2 are input.

More specifically, the synthesis module compares amplitude α1 of input vibration pattern 1 and amplitude α2 of vibration pattern 2 with each other in each prescribed period and selects a vibration pattern greater in value thereof as a valid output. The synthesis module outputs frequency f and amplitude α designating any one vibration pattern in accordance with a result of output of a function max(α1, α2) in any prescribed period.

Frequency f1 of vibration pattern 1 and frequency f2 of vibration pattern 2 are not taken into account and only an amplitude of each vibration pattern is compared. Thus, in the selection scheme, regardless of whether frequency f1 of vibration pattern 1 and frequency f2 of vibration pattern 2 are the same or different, vibration data greater in amplitude is selected. By adopting such a configuration, determination processing can be more simplified.

One example of a procedure of processing in the synthesis method in accordance with the selection scheme according to the present embodiment will be described with reference to FIGS. 10A to 10D. FIGS. 10A to 10D show examples of combinations of a frequency and an amplitude of vibration pattern 1 and vibration pattern 2 in each of unit periods T1 to T4.

Figure 10A:
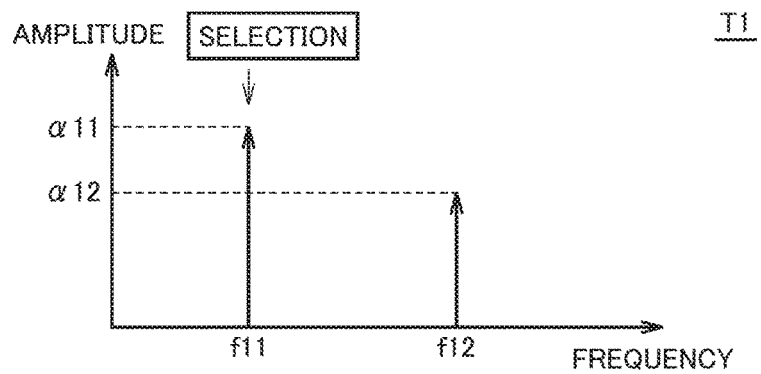
FIGS. 10A to 10D show exemplary illustrative non-limiting drawings illustrating a procedure of processing in the synthesis method in accordance with the selection scheme according to the present embodiment.
Figure 10B:
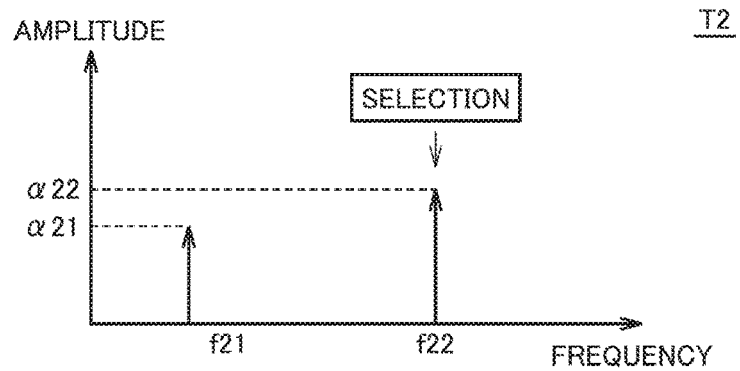
Figure 10C:
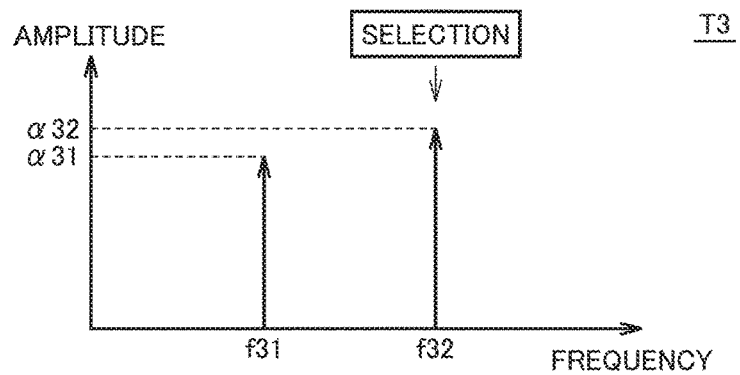
Figure 10D:
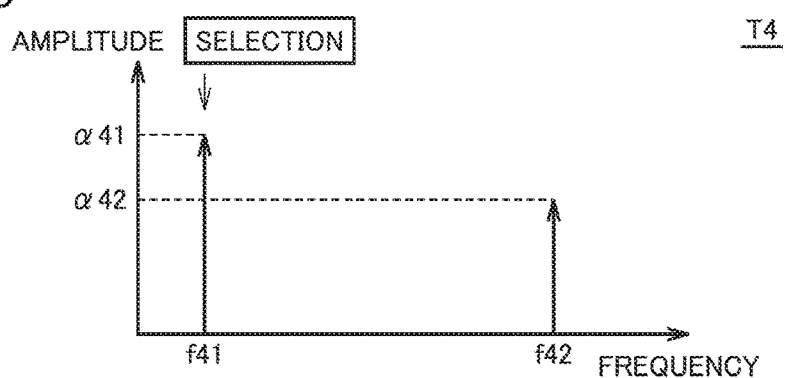

In unit period T1 shown in FIG. 10A, since an amplitude $\alpha 11$ of pattern 1 is higher than an amplitude $\alpha 12$ of pattern 2, a combination of a frequency f11 and amplitude $\alpha 11$ of pattern 1 is output as a synthesized pattern. In successive unit period T2 (FIG. 10B), since an amplitude $\alpha 22$ of pattern 2 is higher than an amplitude $\alpha 21$ of pattern 1, a combination of a frequency f22 and amplitude $\alpha 22$ of pattern 2 is output as a synthesized pattern. In successive unit period T3 (FIG. 10C) as well, since an amplitude $\alpha 32$ of pattern 2 is higher than an amplitude $\alpha 31$ of pattern 1, a combination of a frequency f32 and amplitude $\alpha 32$ of pattern 2 is output as a synthesized pattern. In successive unit period T4 (FIG. 10D), since an amplitude $\alpha 41$ of pattern 1 is higher than an amplitude $\alpha 42$ of pattern 2, a combination of a frequency f41 and an amplitude $\alpha 41$ of pattern 1 is output as a synthesized pattern.

Since a synthesized pattern is represented by a combination of a frequency and an amplitude of a vibration pattern, vibration strength can be compared based on a value for an amplitude without performing additional processing. By making comparison in accordance with a sampling period with such a method, an amplitude in a prescribed period is represented by one parameter and comparison can be facilitated.

(d2: Selection Scheme: Plurality of Pieces of Vibration Data)

Figure 11A:
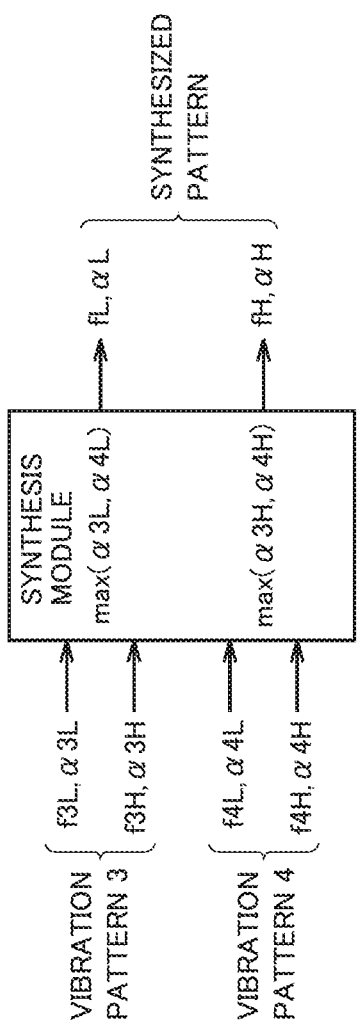
FIGS. 11A and 11B show exemplary illustrative non-limiting drawings illustrating mounting of another synthesis method in accordance with the selection scheme according to the present embodiment.
Figure 11B:
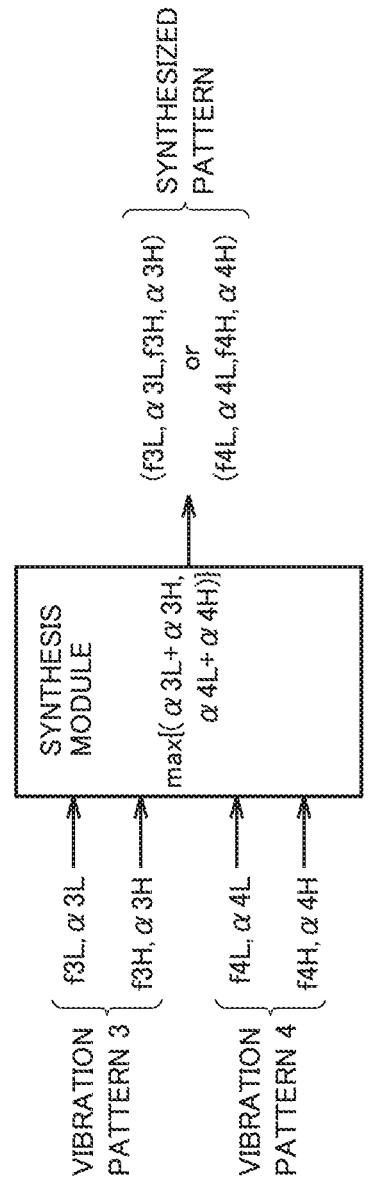

Another mount example of the synthesis method in accordance with the selection scheme according to the present embodiment will be described with reference to FIGS. 11A and 11B. FIGS. 11A and 11B show a mount example in which each of vibration patterns 3 and 4 is designated by a combination of two main components (a low frequency band and a high frequency band). Each of vibration patterns 3 and 4 is defined by a combination of a frequency and an amplitude in a low frequency band and a combination of a frequency and an amplitude at a high frequency. Specifically, vibration pattern 3 is designated by a frequency f3L and an amplitude $\alpha 3L$ in a low frequency band and a frequency f3H and an amplitude $\alpha 3H$ in a high frequency band. Vibration pattern 4 is designated by a frequency f4L and an amplitude $\alpha 4L$ in the low frequency band and a frequency f4H and an amplitude $\alpha 4H$ in the high frequency band.

Thus, one vibration source representing a vibration command generation function simultaneously generates vibration data (frequency f3L and amplitude $\alpha 3L$) representing one main component and vibration data (frequency f3H and amplitude $\alpha 3H$) representing another main component. A frequency (frequency f3L) of one main component is set to be lower than a frequency (frequency f3H) of another main component.

Similarly, another vibration source representing a vibration command generation function simultaneously generates vibration data (frequency f4L and amplitude $\alpha 4L$) representing one main component and vibration data (frequency f4H and amplitude $\alpha 4H$) representing another main component. A frequency (frequency f4L) of one main component is set to be lower than a frequency (frequency f4H) of another main component.

A frequency and an amplitude designating a vibration pattern as described above are assumed to be updated in response to change per unit period in vibration waveform to be activated. Vibration pattern 3 (frequency f3L and amplitude $\alpha 3L$ and frequency f3H and amplitude $\alpha 3H$) and vibration pattern 4 (frequency f4L and amplitude $\alpha 4L$ and frequency f4H and amplitude $\alpha 4H$) are output every unit period set for a vibration waveform to be defined as a command value. If there is no change from a value in an immediately preceding unit period, a new value does not have to be output. A value (parameter) defining a vibration pattern may be output only when definition of a vibration pattern should also be changed in switching from one unit period to a next unit period.

The synthesis module outputs a frequency fH and an amplitude H (sixth vibration data) in a high frequency band of a synthesized pattern in addition to a frequency fL and an amplitude L (third vibration data) in a low frequency band of the synthesized pattern when frequency f3H and amplitude $\alpha 3H$ (fourth vibration data) in the high frequency band of vibration pattern 3 and frequency f4H and amplitude $\alpha 4H$ (fifth vibration data) in the high frequency band of vibration pattern 4 are input in addition to frequency f3L and amplitude $\alpha 3L$ (first vibration data) in the low frequency band of vibration pattern 3 and frequency f4L and amplitude $\alpha 4L$ (second vibration data) in the low frequency band of vibration pattern 4.

When vibration data is defined for each frequency in each vibration pattern, vibration data having frequencies corresponding to each other may be synthesized with each other. The synthesis module may output third vibration data from two pieces of vibration data of the first to fourth vibration data and output sixth vibration data from two remaining pieces of vibration data in accordance with a frequency of a main component represented by the input vibration data.

When a vibration pattern is composed of a plurality of main components as described above, two methods as below are possible depending on which amplitude is to be compared.

FIG. 11A shows a method of independently determining a high frequency band and a low frequency band. Referring to FIG. 11A, amplitude $\alpha 3L$ in the low frequency band of vibration pattern 3 and amplitude $\alpha 4L$ in the low frequency band of vibration pattern 4 (that is, a function max($\alpha 3L$, $\alpha 4L$)) are compared with each other, and amplitude $\alpha 3H$ in the high frequency band of vibration pattern 3 and amplitude $\alpha 4H$ in the high frequency band of vibration pattern 4 (that is, a function max($\alpha 3H$, $\alpha 4H$)) are compared with each other, and information representing a greater amplitude in each comparison (frequency fL and an amplitude $\alpha L$ in the low frequency band and frequency fH and an amplitude $\alpha H$ in the high frequency band) is output as a synthesized pattern.

Thus, when a plurality of pieces of vibration data generated by one vibration source and a plurality of pieces of vibration data generated by another vibration source are input, vibration data exhibiting a greatest amplitude among amplitudes of respective pieces of vibration data is selected. In the example shown in FIGS. 11A and 11B, when vibration pattern 3 including two main components (frequency f3L and amplitude $\alpha 3L$ and frequency f3H and amplitude $\alpha 3H$) and vibration pattern 4 including two other main components (frequency f4L and amplitude α4L and frequency f4H and amplitude α4H) are input, vibration data greater in amplitude is selected every prescribed period based on amplitude α3L of vibration pattern 3 and amplitude α4L of vibration pattern 4. Similarly, vibration data greater in amplitude is selected every prescribed period based on amplitude α3H of vibration pattern 3 and amplitude α4H of vibration pattern 4.

By adopting the selection scheme shown in FIG. 11A, vibration data greater in amplitude in each frequency band is selected from among frequencies contained in each of vibration patterns 3 and 4 so that a more characteristic vibratory stimulus can be provided to a user.

Only an amplitude of each vibration pattern may be compared without taking into account whether frequency f3L in the low frequency band of vibration pattern 3 and frequency f4L in the low frequency band of vibration pattern 4 are the same or different and whether frequency f3H in the high frequency band of vibration pattern 3 and frequency f4H in the high frequency band of vibration pattern 4 are the same or different.

FIG. 11B shows a method of collectively determining the high frequency band and the low frequency band. Referring to FIG. 11B, an amplitude resulting from synthesis of amplitude α3L in the low frequency band and amplitude α3H in the high frequency band of vibration pattern 3 and an amplitude resulting from synthesis of amplitude α4L in the low frequency band and amplitude α4H in the high frequency band of vibration pattern 4 (that is, a function max(α3L+α3H, α4L+α4H)) are compared with each other, and a vibration pattern representing a greater amplitude in comparison is output as a synthesized pattern. The entirety of any vibration pattern is selectively output based on a value (α3L+α3H) calculated from amplitude α3L of the first vibration data and amplitude α3H of the second vibration data contained in vibration pattern 3 and a value (α4L+α4H) calculated from amplitude α4L of the third vibration data and amplitude α4H of the fourth vibration data contained in vibration pattern 4.

Thus, when a plurality of pieces of vibration data including the first vibration data generated by the first vibration command generation function representing one vibration source and a plurality of pieces of vibration data including the second vibration data generated by the second vibration command generation function representing another vibration source are input, a plurality of pieces of vibration data greater in total of amplitudes is selected every prescribed period based on a total of amplitudes represented by the plurality of pieces of vibration data generated by the first vibration command generation function and a total of amplitudes represented by the plurality of pieces of vibration data generated by the second vibration command generation function.

In the selection scheme shown in FIG. 11B, an amplitude of an input vibration pattern may be evaluated as being weighted by a frequency. Since a human is generally more sensitive to vibrations in the low frequency band, for example, an amplitude in the low frequency band may be multiplied by a weight coefficient (for example, b>1) greater than that for an amplitude in the high frequency band. In this case, which amplitude is greater may be determined by making use of a function max(b×α3L+α3H, b×α4L+α4H).

By adopting the selection scheme shown in FIG. 11B, a vibration pattern greater in amplitude as a whole is selected from vibration patterns 3 and 4, and hence a vibratory stimulus can be provided to a user while characteristics of input vibration patterns as a whole are maintained.

Only an amplitude of each vibration pattern may be compared without taking into account whether frequency f3L in the low frequency band of vibration pattern 3 and frequency f4L in the low frequency band of vibration pattern 4 are the same or different and whether frequency f3H in the high frequency band of vibration pattern 3 and frequency f4H in the high frequency band of vibration pattern 4 are the same or different.

A prescribed number of frequencies may be selected from frequencies contained in vibration patterns 3 and 4 based on magnitude of each amplitude. Two greatest frequencies of amplitude α3L in the low frequency band of vibration pattern 3, amplitude α3H in the high frequency band of vibration pattern 3, amplitude α4L in the low frequency band of vibration pattern 4, and amplitude α4H in the high frequency band of vibration pattern 4 may be extracted and output as a synthesized pattern.

Though processing in an example in which two vibration patterns are input to a synthesis module is exemplified for the sake of convenience of description in the description above, a similar processing method can obviously be expanded to an example in which three or more vibration patterns are input (d3: Addition Scheme: Single Piece of Vibration Data)

The method of synthesizing vibration patterns in accordance with the addition scheme according to the present embodiment will be described with reference to FIG. 12. FIG. 12 shows an example in which a vibration pattern 5 and a vibration pattern 6 are input. Vibration patterns 5 and 6 exhibit characteristics of change over time similar to each other.

The synthesis module adds vibration strengths of input vibration patterns every prescribed period and then outputs a vibration pattern. A synthesized pattern is a result of combination of vibration pattern 5 and vibration pattern 6 with each other on a time axis.

By adopting such an addition scheme, for example, in such a situation that a plurality of vibrations of a similar type may frequently be superimposed on one another, a user can perceive the number itself of vibrations superimposed on one another.

Figure 13:
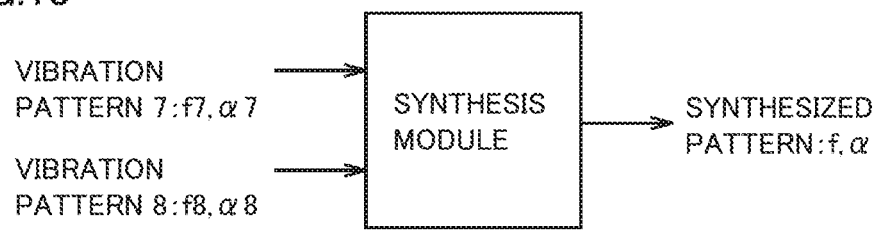
FIG. 13 shows an exemplary illustrative non-limiting drawing illustrating mounting of the synthesis method in accordance with the addition scheme according to the present embodiment.

A mount example of the synthesis method in accordance with the addition scheme according to the present embodiment will be described with reference to FIG. 13. FIG. 13 shows a mount example in which each of vibration patterns 7 and 8 is designated by one of combinations of a frequency and an amplitude. It is assumed that a frequency f7 and an amplitude α7 of a vibration pattern 7 and a frequency f8 and an amplitude α8 of a vibration pattern 8 are updated every prescribed period.

The synthesis module outputs frequency f and amplitude α (third vibration data) of the synthesized pattern when frequency f7 and amplitude α7 (first vibration data) of vibration pattern 7 and frequency f8 and amplitude α8 (second vibration data) of vibration pattern 8 are input.

More specifically, the synthesis module determines amplitude α of the synthesized pattern by adding amplitude α7 of vibration pattern 7 and amplitude α8 of vibration pattern 8 to each other. Typically, amplitude α=amplitude α7+amplitude α8 is calculated.

"Addition" of amplitudes herein may include not only pure addition of a plurality of components but also processing for summing after weighting with some kind of factor. For example, in the example shown in FIG. 13, amplitude α=amplitude α7+a coefficient a1×amplitude α8 or amplitude α=a coefficient a2×amplitude α7+amplitude α8 may be calculated. A result obtained by addition should only reflect a value of an amplitude of interest. Therefore, typically, relation of "amplitude α after addition>amplitude α7" or "amplitude α after addition>amplitude α8" should only be satisfied.

The synthesis module determines frequency f of a synthesized pattern based on frequency f7 of vibration pattern 7 and frequency f8 of vibration pattern 8. The synthesis module determines any frequency within a range from frequency f7 of vibration pattern 7 (first vibration data) to frequency f8 of vibration pattern 8 (second vibration data) as frequency f of a synthesized pattern (third vibration data). Specifically, relation of frequency f of vibration pattern 7≤frequency f of synthesized pattern≤frequency f8 of vibration pattern 8 (f7<f8) or frequency f8 of vibration pattern 8≤frequency f of synthesized pattern≤frequency f7 of vibration pattern 7 (f7>f8) is satisfied.

Limitation only to a frequency within a range from frequency f7 of vibration pattern 7 to frequency f8 of vibration pattern 8 is not intended, and a frequency in the vicinity of a range from frequency f7 of vibration pattern 7 to frequency f8 of vibration pattern 8 may be included. Since the synthesis module should only output a synthesized pattern on which frequency components of input vibration pattern 7 and vibration pattern 8 are reflected, a frequency in the vicinity of at least any frequency component of such an input vibration pattern may be adopted.

One example of a procedure of processing in the synthesis method in accordance with the addition scheme according to the present embodiment will be described with reference to FIG. 14. When vibration pattern 7 having amplitude α7 and frequency f7 and vibration pattern 8 having amplitude α8 and frequency f8 are input, the synthesis module determines amplitude α of a synthesized pattern by adding amplitude α7 and amplitude α8 to each other, and determines frequency f within a range from frequency f7 to frequency f8. The synthesized pattern is determined by thus determined amplitude α and frequency f.

Some examples of a method of determining frequency f of a synthesized pattern will be described below.

(1) Scheme of Determining Frequency as Being Dependent on Amplitude

Initially, a frequency of a synthesized pattern may be determined by frequencies of input vibration patterns based on relation between amplitudes of the input vibration patterns. The synthesis module determines a frequency of a synthesized pattern from a frequency of the first vibration pattern and a frequency of the second vibration pattern based on relation between an amplitude of the input first vibration pattern and an amplitude of the input second vibration pattern.

For example, by taking into account an amplitude of each such vibration pattern, characteristics of a vibration pattern relatively greater in amplitude among a plurality of input vibration patterns can more strongly be reflected on a synthesized pattern. This is naturally also the case in an example to the contrary.

Figure 14:
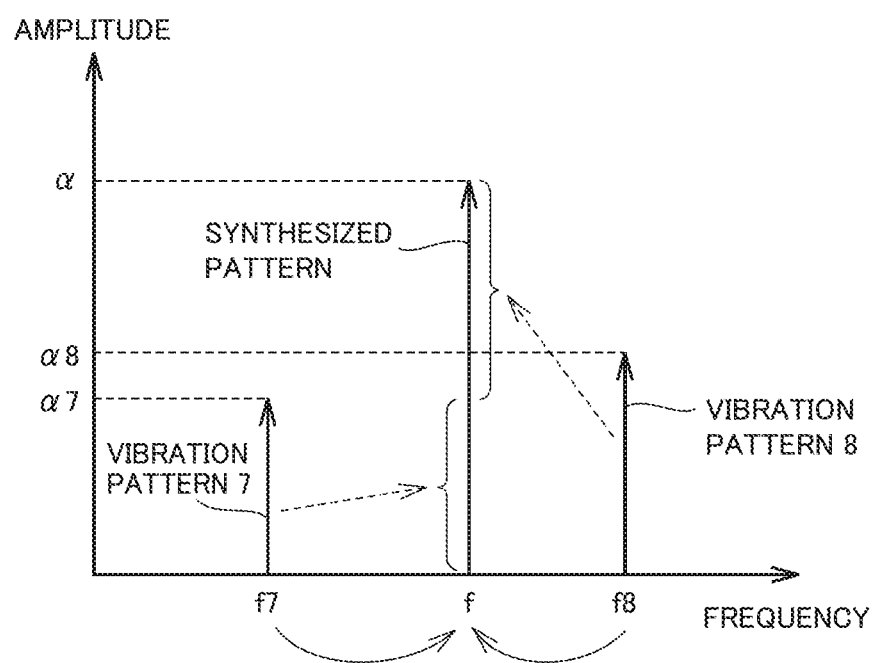
FIG. 14 shows an exemplary illustrative non-limiting drawing illustrating a procedure of processing in the synthesis method in accordance with the addition scheme according to the present embodiment.

In the example shown in FIG. 14, frequency f of a synthesized pattern may be determined by frequency f7 of vibration pattern 7 and frequency f8 of vibration pattern 8 based on relation between amplitude α7 of vibration pattern 7 and amplitude α8 of vibration pattern 8.

(1-1) Weighted Arithmetic Mean

A weighted arithmetic mean can be used as one example of a scheme of determining a frequency as being dependent on such an amplitude. The synthesis module determines as a frequency of the synthesized pattern, an arithmetic mean of a frequency of the first vibration pattern and a frequency of the second vibration pattern as being weighted by a weight coefficient dependent on an amplitude of the first vibration pattern and an amplitude of the second vibration pattern. Specifically, frequency f of the synthesized pattern can be calculated in accordance with an equation as below in connection with input vibration pattern 7 (amplitude α7 and frequency f7) and input vibration pattern 8 (amplitude α8 and frequency f8).

$$\text{Frequency } f=(f7\cdot\alpha 7+f8\cdot\alpha 8)/(\alpha 7+\alpha 8)$$

By using such a weighted arithmetic mean, a calculated frequency of the synthesized pattern more strongly reflects influence by a frequency of vibration data as the vibration data is greater in amplitude.

(1-2) Weighted Geometric Mean

A weighted geometric mean can be used as another example of a scheme of determining a frequency as being dependent on an amplitude. The synthesis module determines as a frequency of the synthesized pattern, a geometric mean of a frequency of the first vibration pattern and a frequency of the second vibration pattern as being weighted by a weight coefficient dependent on an amplitude of the first vibration pattern and an amplitude of the second vibration pattern. Specifically, frequency f of the synthesized pattern can be calculated in accordance with an equation as below in connection with input vibration pattern 7 (amplitude α7 and frequency f7) and input vibration pattern 8 (amplitude α8 and frequency f8).

$$\text{Frequency } f=f7\char`\^\{\alpha 7/(\alpha 7+\alpha 8)\}\times f8\char`\^\{\alpha 8/(\alpha 7+\alpha 8)\}$$

With weighted exponentiation of frequency f7 and frequency f8, a frequency as a geometric mean can be determined. Similarly to a weighted geometric mean, a frequency can also be calculated with a logarithm of a frequency. In this case, frequency f of a synthesized pattern can be calculated in accordance with an equation as below.

$$\text{Frequency } f=\exp\char`\^\{\alpha 7/(\alpha 7+\alpha 8)\times\log(f7)+\alpha 8/(\alpha 7+\alpha 8)\times\log(f8)\}$$

(1-3) Another Weighting Method

In addition to the weighted arithmetic mean and the weighted geometric mean described above, any function using a weight coefficient based on each amplitude of each input vibration pattern can be used.

(2) Scheme of Adopting Frequency of Vibration Pattern Greatest in Amplitude

A frequency of a vibration pattern greatest in amplitude may be adopted as another scheme of determining a frequency of a synthesized pattern from frequencies of input vibration patterns based on relation between amplitudes of the input vibration patterns. The synthesis module determines a frequency of a vibration pattern greater in amplitude of the first vibration pattern and the second vibration pattern as a frequency of the synthesized pattern.

Specifically, which of input vibration pattern 7 (amplitude α7 and frequency f7) and input vibration pattern 8 (amplitude α8 and frequency f8) is greater in amplitude is determined and a frequency of the vibration pattern greatest in amplitude may be determined as a frequency of a synthesized pattern.

(3) Scheme of Adopting Average Value of Frequencies of Input Vibration Patterns

An average value of frequencies of input vibration patterns may be determined as a frequency of a synthesized pattern. Typically, an arithmetic mean can be used as such an average value. A median between a frequency of the first vibration pattern and a frequency of the second vibration pattern may be determined as a frequency of the synthesized pattern. In this case, frequency f of a synthesized pattern can be calculated in accordance with an equation as below.

Frequency $f=(f7+f8)/2$

Alternatively, a geometric mean can also be used. A geometric mean of a frequency of the first vibration pattern and a frequency of the second vibration pattern may be determined as a frequency of the synthesized pattern. In this case, frequency f of a synthesized pattern can be calculated in accordance with an equation as below.

Frequency $f=\sqrt{(f7 \times f8)}$

Alternatively, a power mean can also be used. In this case, frequency f of a synthesized pattern can be calculated in accordance with an equation as below (n being a positive integer).

Frequency $f=((f7^n+f8^n)/n)^{(1/n)}$

In addition to various methods of calculating an average value described above, a method of calculating any average value can be adopted.

As described above, when an input vibration pattern is designated with a frequency domain, a frequency of a synthesized pattern can be determined with the method as described above. An arithmetic mean or a geometric mean may be used as a method of calculating an average value. Though the geometric mean rather than the arithmetic mean is preferably used as an average value of frequencies, the arithmetic mean may be used from a point of view of reduced load on processing. By adopting such a method, the number of combinations of a frequency and an amplitude defining an output synthesized pattern is not increased and internal processing can be more efficient.

(d4: Addition Scheme: Plurality of Pieces of Vibration Data)

Another mount example of the synthesis method in accordance with the addition scheme according to the present embodiment will be described with reference to FIG. 15. FIG. 15 shows a mount example in designating each of vibration patterns 9 and 10 with a combination of two main components (in the low frequency band and the high frequency band). Each of vibration patterns 9 and 10 is defined by a combination of a frequency and an amplitude in the low frequency band and a combination of a frequency and an amplitude at a high frequency. Specifically, vibration pattern 9 is designated by a frequency f9L and an amplitude α9L in the low frequency band and a frequency f9H and an amplitude α9H in the high frequency band. Vibration pattern 10 is designated by a frequency f10L and an amplitude α10L in the low frequency band and a frequency f10H and an amplitude α10H in the high frequency band. It is assumed that a frequency and an amplitude designating the vibration pattern are updated every prescribed period.

The synthesis module outputs a synthesized pattern (frequency fL and amplitude αL in the low frequency band and frequency fH and amplitude αH in the high frequency band) upon receiving inputs of vibration patterns 9 and 10. The synthesis module outputs frequency fH and amplitude H (sixth vibration data) in the high frequency band of the synthesized pattern in addition to frequency fL and amplitude L (third vibration data) in the low frequency band of the synthesized pattern when frequency f9H and amplitude α9H in the high frequency band of vibration pattern 9 (fourth vibration data) and frequency f10H and amplitude α10H in the high frequency band of vibration pattern 10 (fifth vibration data) are input in addition to frequency f9L and amplitude α9L in the low frequency band of vibration pattern 9 (first vibration data) and frequency f10L and amplitude α10L in the low frequency band of vibration pattern 10 (second vibration data).

When vibration data is defined for each frequency in each vibration pattern, vibration data having frequencies corresponding to each other may be synthesized. The synthesis module may output third vibration data from two pieces of vibration data of first to fourth vibration data and output sixth vibration data from two remaining pieces of vibration data in accordance with a frequency of input vibration data.

Amplitude αL in the low frequency band and amplitude αH in the high frequency band of the synthesized pattern may be calculated by adding amplitudes in the low frequency band and amplitudes in the high frequency band of vibration patterns 9 and 10. The synthesis module determines amplitude αL in the low frequency band (third vibration data) of the synthesized pattern by adding amplitude αL9 in the low frequency band represented by vibration pattern 9 and amplitude αL10 in the low frequency band represented by vibration pattern 10 (second vibration data) to each other. Similarly, the synthesis module determines amplitude αH in the high frequency band of the synthesized pattern (sixth vibration data) by adding amplitude αH9 in the high frequency band represented by vibration pattern 9 (fourth vibration data) and amplitude αH10 in the high frequency band represented by vibration pattern 10 (fifth vibration data) to each other.

Specifically, amplitude αL in the low frequency band of the synthesized pattern=amplitude αL9+amplitude αL10 and amplitude αH in the high frequency band of the synthesized pattern=amplitude αH9+amplitude αH10 can be calculated.

There are four frequencies in total designating input vibration patterns 9 and 10, whereas there are two frequencies of an output synthesized pattern. Therefore, an input and an output should be matched with each other. Types as below can be assumed as a scheme for calculating a frequency of a synthesized pattern as described above.

(1) Scheme of Determining Frequency as being Dependent on Amplitude

A frequency of a synthesized pattern may be determined by a frequency for each frequency band included in an input vibration pattern based on relation between amplitudes for each frequency band included in the input vibration pattern. The synthesis module determines a frequency of the synthesized pattern from a frequency of the first vibration pattern and a frequency of the second vibration pattern based on relation between an amplitude of the input first vibration pattern and an amplitude of the input second vibration pattern.

For example, taking into account an amplitude of each such vibration pattern, characteristics of a vibration pattern relatively great in amplitude of a plurality of input vibration patterns can more strongly be reflected on a synthesized pattern. This is naturally also the case in an example to the contrary.

In the example shown in FIG. 15, frequency fL in the low frequency band of the synthesized pattern may be determined by frequency fL9 in the low frequency band of vibration pattern 9 and frequency fL10 in the low frequency band of vibration pattern 10 based on relation between amplitude αL9 in the low frequency band of vibration pattern 9 and amplitude αL10 in the low frequency band of vibration pattern 10. Similarly, frequency fH in the high frequency band of the synthesized pattern may be determined by frequency fH9 in the high frequency band of vibration pattern 9 and frequency fH10 in the high frequency band of vibration pattern 10 based on relation between amplitude αH9 in the high frequency band of vibration pattern 9 and amplitude αH10 in the high frequency band of vibration pattern 10.

(1-1) Weighted Arithmetic Mean

A weighted arithmetic mean can be used as one example of a scheme of determining a frequency as being dependent on such an amplitude. The synthesis module determines as a frequency of the synthesized pattern, an arithmetic mean of a frequency of the first vibration pattern and a frequency of the second vibration pattern as being weighted by a weight coefficient dependent on an amplitude of the first vibration pattern and an amplitude of the second vibration pattern. Specifically, a frequency of a synthesized pattern can be calculated in accordance with an equation as below in connection with input vibration pattern 9 (amplitude αL9 and frequency fL9 and amplitude αH9 and frequency fH9) and input vibration pattern 10 (amplitude αL10 and frequency fL10 and amplitude αH10 and frequency fH10).

Frequency $fL$ in low frequency band of synthesized pattern$=(\alpha 9L \cdot f9L + \alpha 10L \cdot f10L)/(\alpha 9L + \alpha 10L)$ Frequency $fH$ in high frequency band of synthesized pattern$=(\alpha 9H \cdot f9H + \alpha 10H \cdot f10H)/(\alpha 9H + \alpha 10H)$ By using such a weighted arithmetic mean, a calculated frequency of the synthesized pattern more strongly reflects greater influence by the frequency as an amplitude is greater.

(1-2) Weighted Geometric Mean

A weighted geometric mean can be used as another example of a scheme of determining a frequency as being dependent on an amplitude. The synthesis module determines as a frequency of the synthesized pattern, a geometric mean of a frequency of the first vibration pattern and a frequency of the second vibration pattern as being weighted by a weight coefficient dependent on an amplitude of the first vibration pattern and an amplitude of the second vibration pattern. Specifically, a frequency of the synthesized pattern can be calculated in accordance with an equation as below in connection with input vibration pattern 9 (amplitude αL9 and frequency fL9 and amplitude αH9 and frequency fH9) and input vibration pattern 10 (amplitude αL10 and frequency fL10 and amplitude αH10 and frequency fH10).

Frequency $fL$ in low frequency band of synthesized pattern$=f9\widehat{}\{\alpha L9/(\alpha L9+\alpha L10)\} \times f10\widehat{}\{\alpha L10/(\alpha L9+\alpha L10)\}$ Frequency $fH$ in high frequency band of synthesized pattern$=f9\widehat{}\{\alpha H9/(\alpha H9+\alpha H10)\} \times f10\widehat{}\{\alpha H10/(\alpha H9+\alpha H10)\}$ By weighted exponentiation of frequency fL9 and frequency fL10 and frequency fH9 and frequency fH10, a frequency as a geometric mean can be determined. Similarly to the weighted geometric mean, a frequency can also be calculated with a logarithm of the frequency. In this case, frequency f of a synthesized pattern can be calculated in accordance with an equation as below.

Frequency $fL$ in low frequency band of synthesized pattern$=\exp\widehat{}\{\alpha L9/(\alpha L9+\alpha L10)\times \log(fL9)+\alpha L10/(\alpha L9+\alpha L10)\times \log(fL10)\}$ Frequency $fH$ in high frequency band of synthesized pattern$=\exp\widehat{}\{\alpha H9/(\alpha H9+\alpha H10)\times \log(fH9)+\alpha H10/(\alpha H9+\alpha H10)\times \log(fH10)\}$ (1-3) Another Weighting Method In addition to the weighted arithmetic mean and the weighted geometric mean described above, any function using a weight coefficient based on each amplitude of each input vibration pattern can be used.

(2) Scheme of Adopting Frequency of Vibration Pattern Greatest in Amplitude

In another scheme of determining a frequency of a synthesized pattern from frequencies of input vibration patterns based on relation between amplitudes of the input vibration patterns, a frequency of a vibration pattern greatest in amplitude may be adopted. The synthesis module determines as a frequency of the synthesized pattern, a frequency of a vibration pattern greater in amplitude of the first vibration pattern and the second vibration pattern.

In this scheme, in the low frequency band, amplitude α9L in the low frequency band of vibration pattern 9 and amplitude α10L in the low frequency band of vibration pattern 10 are compared with each other, and a frequency greater in amplitude is adopted. In the high frequency band, amplitude α9H in the high frequency band of vibration pattern 9 and amplitude α10H in the high frequency band of vibration pattern 10 are compared with each other, and a frequency greater in amplitude is adopted.

(3) Scheme of Adopting Average Value of Frequencies of Input Vibration Patterns

An average value of frequencies of input vibration patterns may be determined as a frequency of a synthesized pattern. Typically, an arithmetic mean can be used as such an average value. A median between frequencies of two corresponding vibration patterns may be determined as a frequency of the synthesized pattern. In this case, a frequency of a synthesized pattern can be calculated in accordance with an equation as below.

Frequency $fL$ in low frequency band of synthesized pattern$=(fL9+fL10)/2$

Frequency $fH$ in high frequency band of synthesized pattern$=(fH9+fH10)/2$

Alternatively, a geometric mean can also be used. A geometric mean of frequencies of two vibration patterns may be determined as a frequency of the synthesized pattern. In this case, frequency f of a synthesized pattern can be calculated in accordance with an equation as below.

Frequency $fL$ in low frequency band of synthesized pattern$=\sqrt{}(fL9 \times fL10)$ Frequency $fH$ in high frequency band of synthesized pattern$=\sqrt{}(fH9 \times fH10)$ Alternatively, a power mean can also be used. In this case, frequency f of a synthesized pattern can be calculated in accordance with an equation as below (n being a positive integer).

Frequency $fL$ in low frequency band of synthesized pattern$=((fL9\widehat{}n+fL10\widehat{}n)/n)\widehat{}(1/n)$ Frequency $fH$ in high frequency band of synthesized pattern$=((fH9\widehat{}n+fH10\widehat{}n)/n)\widehat{}(1/n)$ In addition to various methods of calculating an average value described above, a method of calculating any average value can be adopted.

As described above, when an input vibration pattern is designated with a frequency domain, a frequency of a synthesized pattern can be determined with the method as described above. An arithmetic mean or a geometric mean may be used as a method of calculating an average value. Though the geometric mean rather than the arithmetic mean is preferably used as an average value of frequencies, the arithmetic mean may be used from a point of view of reduced load on processing. By adopting such a method, the number of combinations of a frequency and an amplitude defining an output synthesized pattern is not increased and internal processing can be more efficient.

Though processing in an example in which two vibration patterns are input to a synthesis module is exemplified for the sake of convenience of description in the description above, a similar processing method can obviously be expanded also to an example in which three or more vibration patterns are input (d5: Hybrid Scheme)

A hybrid scheme which is a combination of the selection scheme and the addition scheme described above may be adopted. In the hybrid scheme, for example, an amplitude of an output synthesized pattern may be determined with the selection scheme and a frequency of the output synthesized pattern may be determined with the addition scheme.

Figure 16:
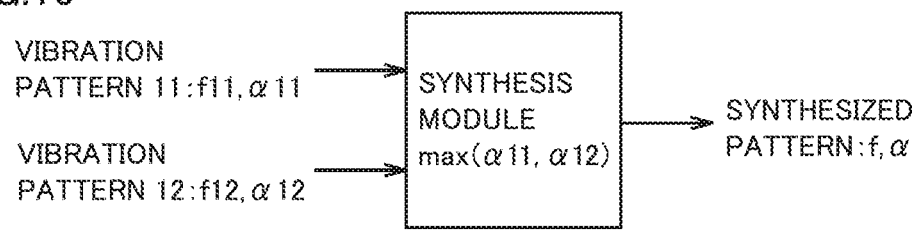
FIG. 16 shows an exemplary illustrative non-limiting drawing illustrating mounting of the synthesis method in accordance with a hybrid scheme according to the present embodiment.

A mount example of the synthesis method in accordance with the hybrid scheme according to the present embodiment will be described with reference to FIG. 16. FIG. 16 shows a mount example in which each of vibration patterns 11 and 12 is designated by one combination of a frequency and an amplitude. It is assumed that a frequency f11 and an amplitude α11 of vibration pattern 11 and a frequency f12 and an amplitude α12 of vibration pattern 12 are updated every prescribed period.

The synthesis module outputs frequency f and amplitude α (third vibration data) of the synthesized pattern when frequency f11 and amplitude α11 of vibration pattern 11 (first vibration data) and frequency f12 and amplitude α12 of vibration pattern 12 (second vibration data) are input.

The synthesis module determines any one of amplitude α11 of vibration pattern 11 (vibration data 1) and amplitude α12 of vibration pattern 12 (vibration data 2) as amplitude α of the synthesized pattern (vibration data 3). More specifically, the synthesis module compares amplitude α11 of vibration pattern 11 and amplitude α12 of vibration pattern 12 with each other and selects an amplitude greater in value as a valid output. The synthesis module outputs amplitude α corresponding to any one vibration pattern in accordance with a result of output of a function max(α11, α12) in each prescribed period.

The synthesis module determines frequency f of the synthesized pattern based on frequency f11 of vibration pattern 11 and frequency f12 of vibration pattern 12. The synthesis module determines any frequency within a range from frequency f11 of vibration pattern 11 (first vibration data) to frequency f12 of vibration pattern 12 (second vibration data) as frequency f of the synthesized pattern (third vibration data). Specifically, relation of frequency f11 of vibration pattern 11 frequency f of synthesized pattern frequency f12 of vibration pattern 12 (f11<f12) or frequency f12 of vibration pattern 12≤frequency f of synthesized pattern frequency f11 of vibration pattern 11 (f11>f12) is satisfied.

Limitation only to a frequency within a range from frequency f11 of vibration pattern 11 to frequency f12 of vibration pattern 12 is not intended, and a frequency in the vicinity of a range from frequency f11 of vibration pattern 11 to frequency f12 of vibration pattern 12 may be included. Since the synthesis module should only output a synthesized pattern on which frequency components of input vibration pattern 11 and vibration pattern 12 are reflected, a frequency in the vicinity of at least any frequency component of such an input vibration pattern may be adopted.

Since a method of determining any frequency within the range from frequency f11 of vibration pattern 11 to frequency f12 of vibration pattern 12 as frequency f of a synthesized pattern is the same as the method of determining frequency f with the addition scheme described above, detailed description will not be repeated.

As described above, in the hybrid scheme, an amplitude of a synthesized pattern is determined with a method the same as the selection scheme described above, whereas a frequency of the synthesized pattern is determined with a method the same as the addition scheme described above. In a typical form of mounting, processing logics corresponding to the plurality of schemes as described above may be prepared and a processing logic may be selected as appropriate depending on a situation by using a selection function as will be described next.

(d6: Selection of Processing)

When an example in which the synthesis modules shown in FIGS. 9, 13, 15, and 16 are mounted as program modules (or libraries) is considered, the synthesis modules may be configured as program modules identical in interface and processing may be switchable as appropriate with any option switch or command.

When the synthesis module is mounted as a program module, in addition to an interface defining an input vibration pattern as shown in FIGS. 9, 13, 15, and 16, an interface for selecting any of the selection scheme, the addition scheme, and the hybrid scheme described above is provided. Then, in the selection scheme, an interface for selecting a method of evaluating a selected vibration pattern may be provided, and in the addition scheme, an interface for selecting a method of calculating a frequency of a synthesized pattern may be provided.

For example, when selection between the addition scheme and the selection scheme described above is made, the selection function activates, in response to an explicit or implicit selection instruction from a developer, any one of processing (addition processing) for adding amplitudes of input vibration data to each other and determining a result of addition as an amplitude of a synthesized pattern and processing (selection processing) for selecting one piece of vibration data from input vibration data and determining an amplitude of the selected vibration data as an amplitude of the synthesized pattern.

By mounting such a selection function, for example, simply by varying a selection instruction in accordance with a situation while the same library is being used, an aimed sensory impulse through vibrations can be provided to a user.

(d7: Multiple-Stage Scheme)

The synthesis modules shown in FIGS. 9, 13, 15, and 16 may be connected to one another. A configuration example in which the synthesis modules according to the present embodiment are connected in multiple stages will be described with reference to FIG. 17. For example, a processing system in which four vibration patterns 13 to 16 are input and one synthesized pattern is output is assumed. In such a case, two synthesis modules are arranged in a preceding stage, two vibration patterns 13 and 14 are input to one synthesis module (a synthesis module 1), and two vibration patterns 15 and 16 are input to the other synthesis module (a synthesis module 2). The synthesis module is configured to accept as an input, vibration data output from another synthesis module.

Synthesis module 1 outputs a result of synthesis of vibration patterns 13 and 14 (a frequency fL' and an amplitude αL' in the low frequency band and a frequency fH' and an amplitude αH' in the high frequency band) and synthesis module 2 outputs a result of synthesis of vibration patterns 15 and 16 (a frequency fL" and an amplitude αL" in the low frequency band and a frequency fH" and an amplitude αH" in the high frequency band). The result of synthesis is input to yet another synthesis module (a synthesis module 3). Synthesis module 3 outputs a final synthesized pattern (frequency fL and amplitude αL in the low frequency band and frequency fH and amplitude αH in the high frequency band) by synthesizing results of synthesis from the synthesis modules.

Figure 17:
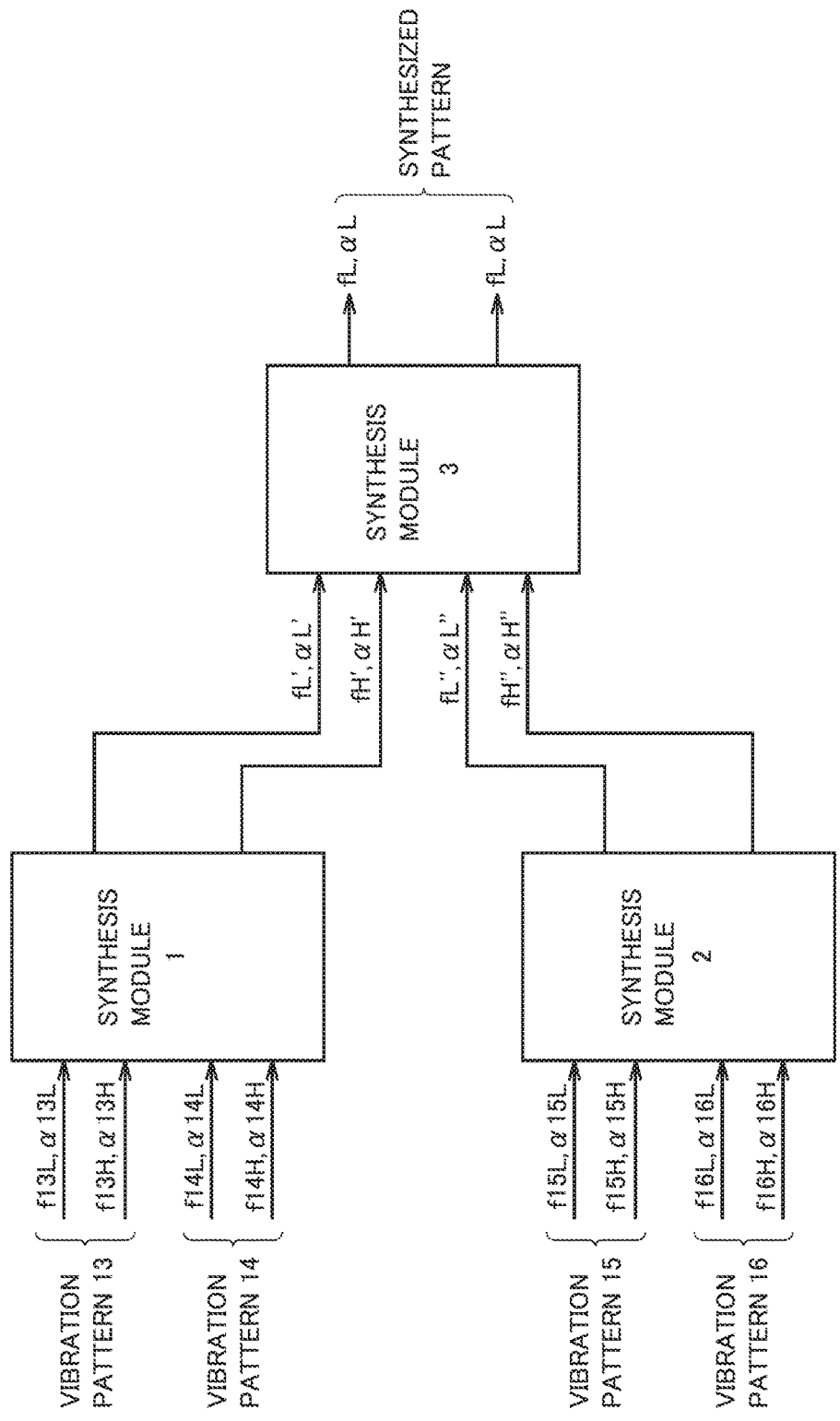
FIG. 17 shows an exemplary illustrative non-limiting drawing illustrating a configuration in which synthesis modules are connected in multiple stages according to the present embodiment.

In an application of the configuration example shown in FIG. 17 in which the synthesis modules are connected in multiple stages, for example, one or more vibration patterns expressing a background environment to be generated in game processing are input to synthesis module 1, while one or more vibration patterns expressing an action of a character to be generated in game processing are input to synthesis module 2. By executing synthesis module 1 and synthesis module 2 in the addition scheme, a vibration pattern integrated with the background environment and a vibration pattern integrated with the action of the character are output. Vibration patterns output from synthesis module 1 and synthesis module 2 are input to synthesis module 3 and synthesis module 3 is executed in the selection scheme, so that both of vibrations expressing the background environment and vibrations expressing the action of the character can be provided to the user.

Any number of synthesis modules may be coupled in series and/or in parallel without being limited to an arrangement example shown in FIG. 17.

(d8: Application)

By adopting a technique to synthesize vibration patterns according to the present embodiment as described above, vibration patterns different in type from each other are synthesized in any application so that a vibratory stimulus can be provided to a user as desired in the application.

In an example of such an application, a rock object rolling down a slope as shown in FIG. 4 described above is expressed with weak and continual vibration patterns and collision of the object with an obstacle on the way is expressed with strong and short vibration patterns. In such a case, each vibration pattern is input to the synthesis module according to the present embodiment in response to occurrence of an event so that a vibratory stimulus can be provided to a user without losing the meaning expressed by each vibration pattern.

Alternatively, engine sound generated at the time when a user operates a user character in a game space and the user character travels on a motor bicycle is expressed with weak and continual first vibration patterns and a state at the time when the motor bicycle collides against or rides over some kind of obstacle during travel is expressed with strong and short second vibration patterns. In such a case as well, as described above, the first vibration patterns are generated while a user character travels in response to an operation by the user, and the second vibration patterns are generated at the timing of collision against or riding over some kind of obstacle during travel. These vibration patterns are input to the synthesis modules as described above. By making use of a synthesized output from the synthesis modules, the user can perceive a vibratory stimulus generated in response to jumping without the vibratory stimulus being buried in weak and continual vibratory stimuli generated during travel of the user character.

(d9: Modification)

Though an example in which an amplitude is adopted as a selection criterion has been described, selection may be made based on displacement in waveform (an instantaneous value). As an amplitude is greater, greater displacement is exhibited. Therefore, a vibration pattern greater in amplitude can indirectly be selected by selecting a vibration pattern based on displacement (an instantaneous value).

(d10: Correction of Sensitivity)

In game system 1 according to the present embodiment, it is an object to provide a sensory impulse through vibrations intended by an application developer to a user who holds controller 200. When a sensory impulse is provided to the user, there may be frequency dependency of vibration characteristics of vibrator 214 of vibration portion 220 and frequency dependency of a sensory impulse felt by a user.

Therefore, in order to correct frequency dependency of a vibrator and a sensory impulse felt by a user, vibration data generated by a vibration source may be corrected in consideration of such frequency dependency.

Figure 18:
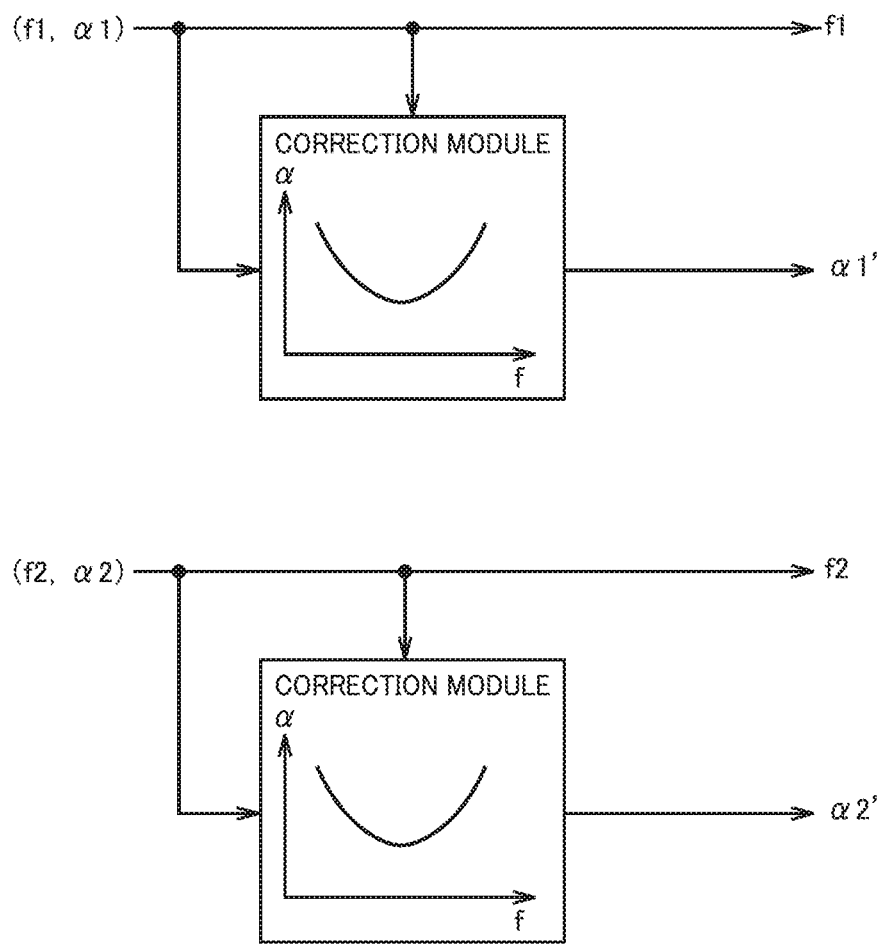
FIG. 18 shows an exemplary illustrative non-limiting drawing illustrating mounting for correcting frequency dependency of vibration data in the game system according to the present embodiment.

A mount example for correcting frequency dependency of vibration data in game system 1 according to the present embodiment will be described with reference to FIG. 18. For example, it is assumed that frequency f1 and amplitude α1 of the first vibration pattern and frequency f2 and amplitude α2 of the second vibration pattern are output as vibration data from vibration sources incorporated in an application.

Frequency f1 of the first vibration pattern and frequency f2 of the second vibration pattern may be provided as they are to synthesis modules, whereas amplitude α1 of the first vibration pattern and amplitude α2 of the second vibration pattern may be provided to the synthesis modules after magnitude thereof is corrected by predetermined correction modules.

The correction module holds frequency characteristics obtained by multiplying frequency characteristics representing vibration strength of vibrator 214 of vibration portion 220 and frequency characteristics representing sensitivity with which a user feels vibrations by each other, and when an amplitude of a vibration pattern is input, the correction module multiplies the input amplitude by a coefficient in accordance with frequency f of the vibration pattern and outputs a result of multiplication.

For example, when the first vibration pattern (frequency f1 and amplitude α1) and the second vibration pattern (frequency f2 and amplitude α2) are output from the vibration sources, the amplitude of each vibration pattern is corrected and then the corrected first vibration pattern (frequency f1 and an amplitude α1') and the corrected second vibration pattern (frequency f2 and an amplitude α2') are provided to the synthesis modules.

The frequency characteristics held by the correction module may be calculated in advance by obtaining frequency characteristics of vibrator 214 of vibration portion 220 of interest and frequency characteristics representing sensitivity of a user.

[E. Functional Configuration]

A main part of a functional configuration mounted on the game system according to the present embodiment will now be described with reference to FIG. 19.

As an application program is executed in system LSI 110 of processing apparatus 100, a user operation determination module 1101, a game progress module 1102, an audiovisual control module 1103, a vibration command generation module 1104, a synthesis module 1105, and a vibration generation control module 1106 are implemented.

Figure 3:
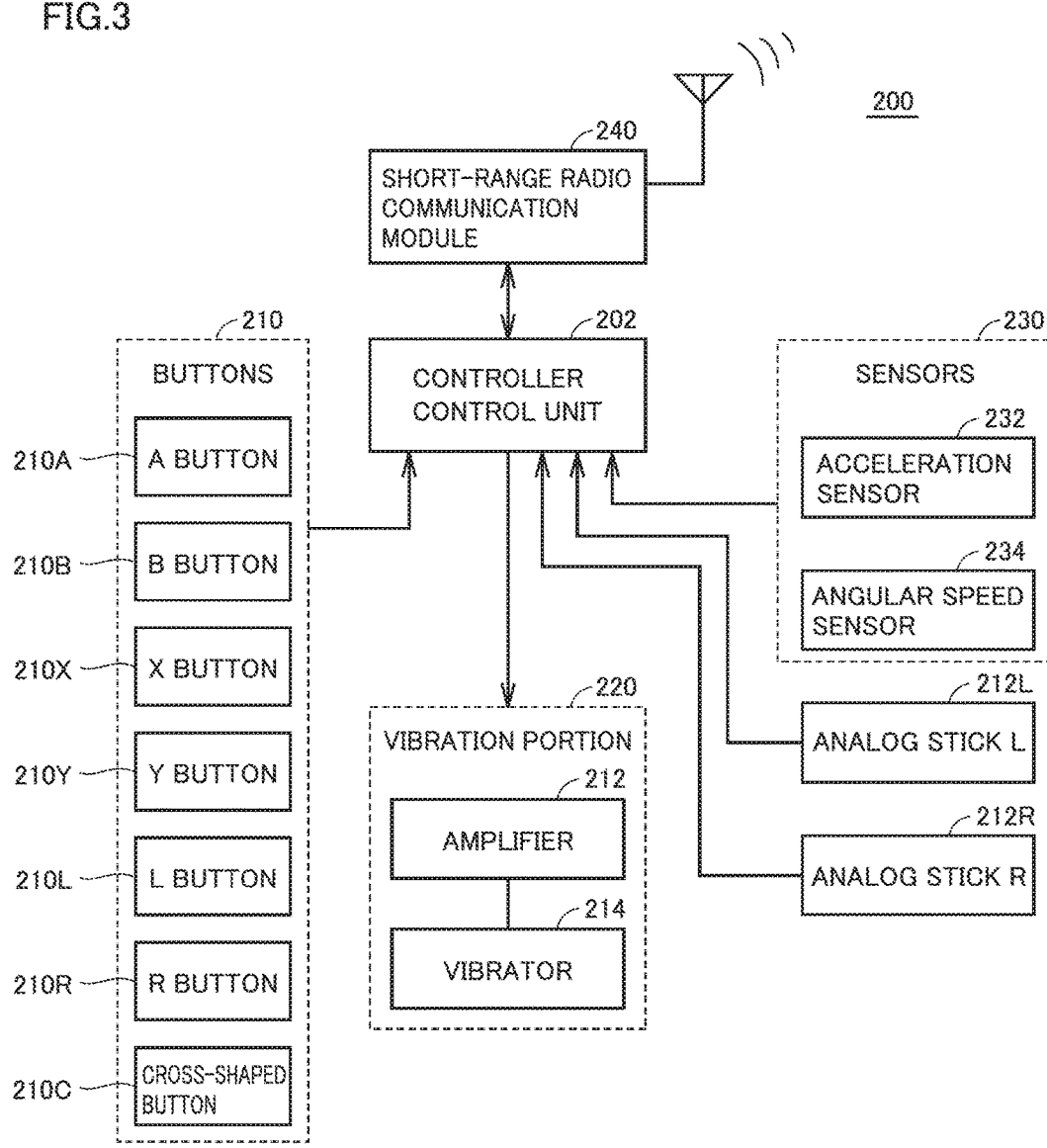
FIG. 3 shows an exemplary illustrative non-limiting drawing illustrating a configuration of a controller included in the game system in the present embodiment.

User operation determination module 1101 determines an operation performed by a user based on a signal (operation information) indicating an operation by a user onto an operation portion of controller 200 (for example, buttons 210 and analog sticks 212L and 212R shown in FIG. 3) and a result of detection by sensors 230 (see FIG. 3) of controller 200. User operation determination module 1101 outputs a content of the operation by the user to game progress module 1102 and vibration command generation module 1104.

Game progress module 1102 corresponds to a game progress function to execute a game application and proceeds with game processing in response to an operation by a user. Specifically, game progress module 1102 updates video images and sound to be output in response to an operation by the user and outputs an event necessary for control of vibrations provided to the user. Game progress module 1102 generates an event in response to an operation by the user.

Audiovisual control module 1103 generates video image outputs and sound outputs based on data from game progress module 1102 and provides output to audiovisual output driver 160. Audiovisual output driver 160 generates a video signal and an audio signal to be given to display 300 in accordance with outputs from audiovisual control module 1103.

Figure 5:
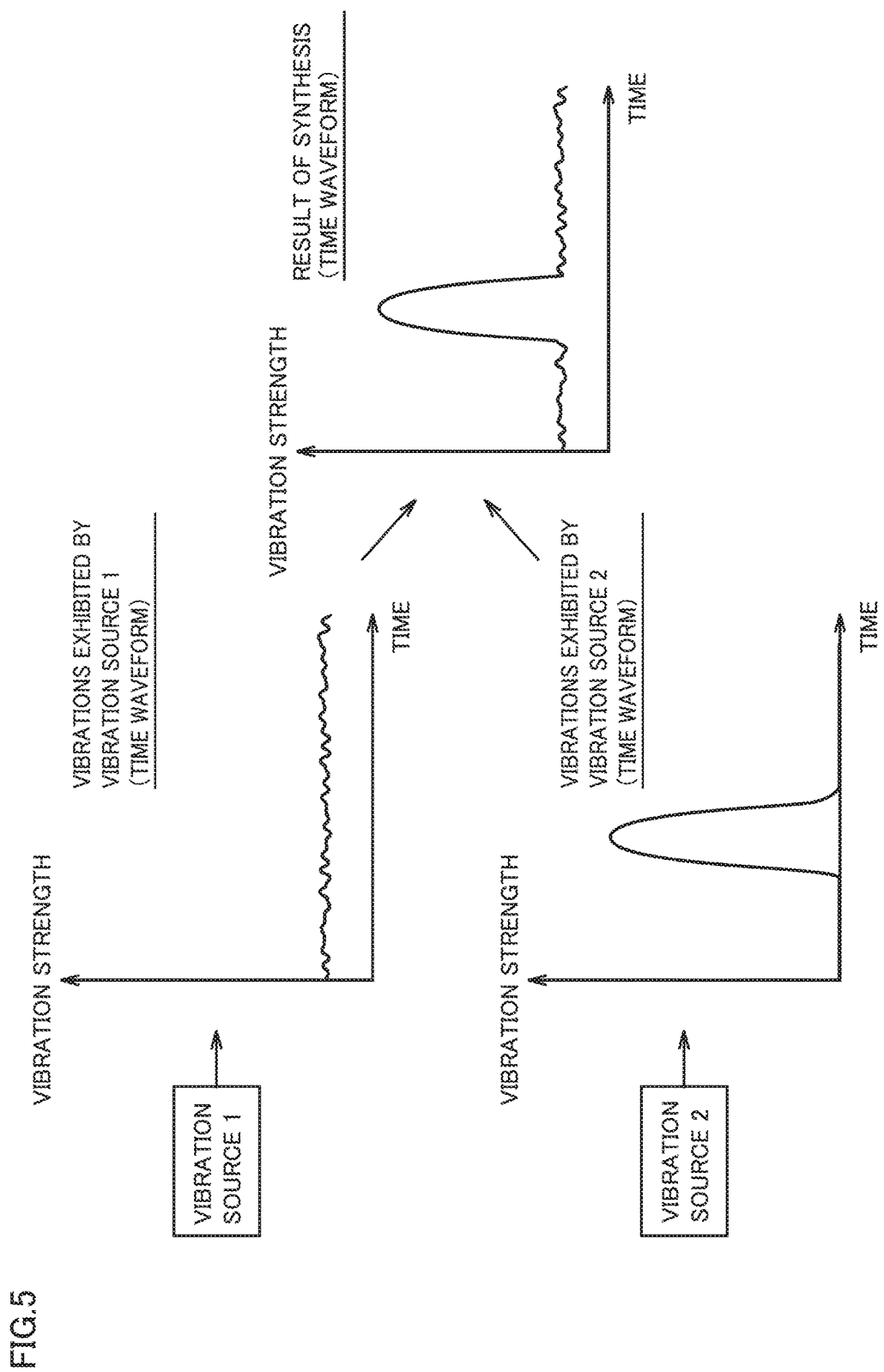

Vibration command generation module 1104 functions as at least a part of the vibration source shown in FIG. 5 described above, and generates vibration data (a vibration pattern) for vibrating a terminal (controller 200 in the present embodiment). When the vibration pattern consists of one main component, vibration command generation module 1104 generates first vibration data (for example, vibration pattern 1 shown in FIG. 9) and second vibration data (for example, vibration pattern 2 shown in FIG. 9). When the vibration pattern consists of a plurality of (for example, two) main components, vibration command generation module 1104 generates fourth vibration data in addition to the first vibration data (two pieces of vibration data being combined, for example, to vibration pattern 3 shown in FIGS. 11A and 11B) and generates fifth vibration data in addition to the second vibration data (two pieces of vibration data being combined, for example, to vibration pattern 4 shown in FIGS. 11A and 11B).

Figure 19:
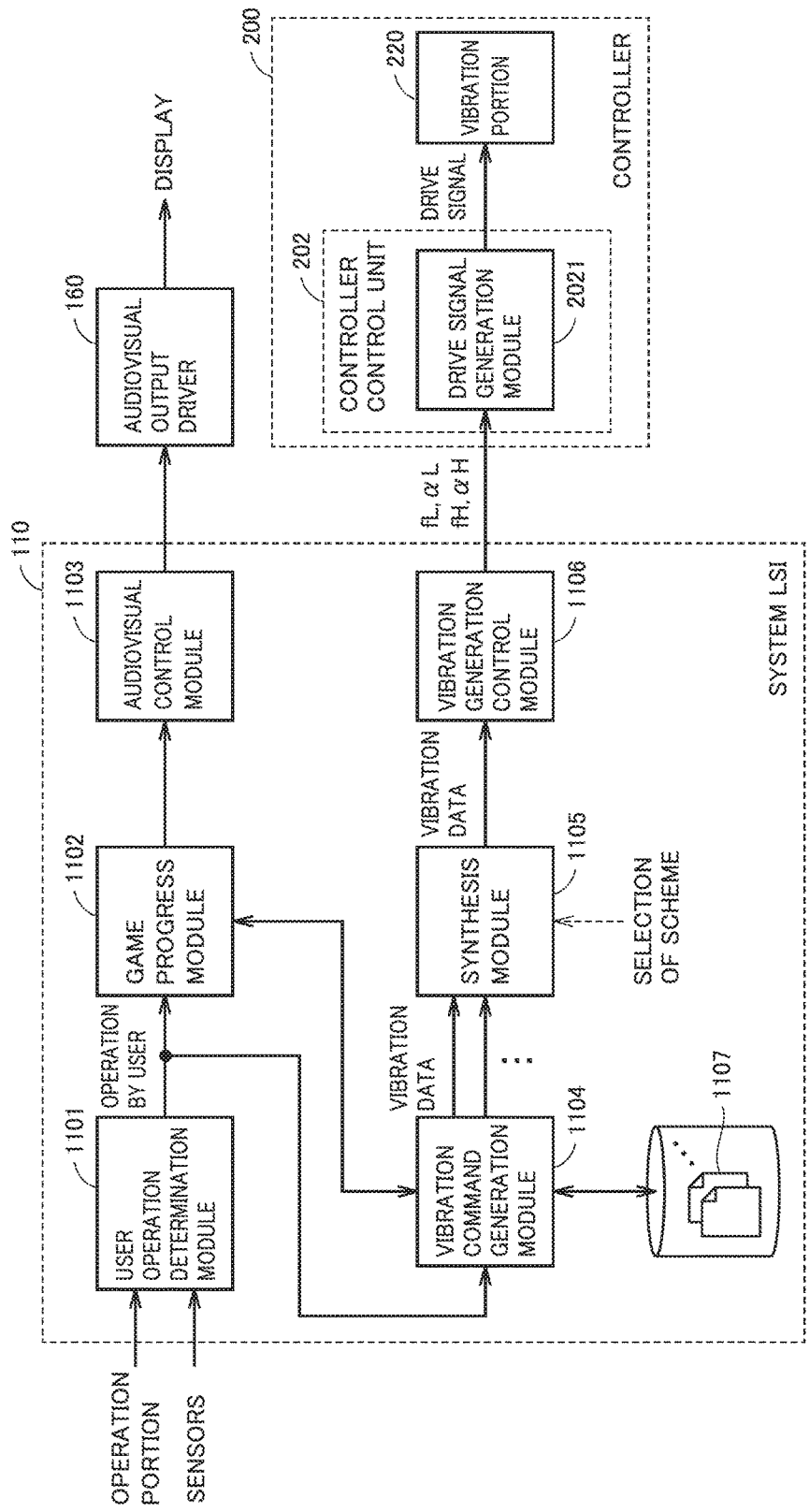
FIG. 19 shows an exemplary illustrative non-limiting block diagram illustrating a main part of a functional configuration mounted on the game system according to the present embodiment.

Though FIG. 19 depicts single vibration command generation module 1104 for the sake of convenience of description, a plurality of vibration command generation modules 1104 may be arranged in accordance with generated vibration patterns.

Vibration command generation module 1104 may generate vibration data in accordance with progress of game processing. Specifically, in response to an event generated by game progress module 1102, vibration command generation module 1104 extracts vibration data corresponding to the event from a prepared vibration data set 1107 and outputs the vibration data set to synthesis module 1105. When game progress module 1102 generates a first event, vibration command generation module 1104 generates first vibration data (and third vibration data), and when game progress module 1102 generates a second event different from the first event, vibration command generation module 1104 generates second vibration data (and fourth vibration data). A plurality of vibration patterns may synchronously or asynchronously be input from vibration command generation module 1104 to synthesis module 1105.

Vibration command generation module 1104 may subject an input signal of a time waveform to frequency analysis and output vibration data (one or more combinations of a frequency and an amplitude) in accordance with a representative component (main component) included in a result of frequency analysis. In this case, instead of vibration data set 1107, a module which generates any time waveform and a module which analyzes a frequency may be adopted.

Vibration command generation module 1104 updates vibration data in accordance with change per unit period (for example, 5 msecs. to several ten msecs.) in vibration waveform in which a terminal of interest should be vibrated. When vibration data defines a vibration waveform with a frequency domain, the time waveform should be divided into each unit period and a frequency component included in change included in each unit period of the time waveform should be updated each time.

Game progress module 1102 may generate an event in response to an operation by a user. Game progress module 1102 is configured to generate a plurality of events, and generates a vibration pattern corresponding to each event. For example, vibration command generation module 1104 generates one vibration pattern in response to one event generated by game progress module 1102 and generates another vibration pattern in response to another event different from the event.

Synthesis module 1105 performs processing for synthesizing vibration patterns as described above and outputs a synthesized pattern. When first vibration data and second vibration data are input to synthesis module 1105, synthesis module 1105 outputs third vibration data. When a command indicating the selection scheme is given to synthesis module 1105, any one of two vibration patterns is selectively output as a synthesized pattern every prescribed period based on an amplitude of one vibration pattern and an amplitude of the other vibration pattern. When a command indicating the addition scheme is given to synthesis module 1105, two vibration patterns are added and output as a synthesized pattern. A scheme selection command for designating a scheme to be selected from the selection scheme and the addition scheme is provided to synthesis module 1105.

The output synthesized pattern is typically defined by frequency fL and amplitude αL in the low frequency band and frequency fH and amplitude αH in the high frequency band.

Vibration generation control module 1106 drives vibration portion 220 of controller 200 based on an output (synthesized pattern) from synthesis module 1105, in coordination with a drive signal generation module 2021. Vibration generation control module 1106 causes a terminal (controller 200) to vibrate based on third vibration data output from the synthesized pattern. More specifically, vibration generation control module 1106 transmits information on the synthesized pattern to controller 200 in accordance with information on the synthesized pattern from synthesis module 1105. Information on the synthesized pattern transmitted from vibration generation control module 1106 to controller 200 may successively be updated with a prescribed period. Though not shown, short-range radio communication module 140 (see FIG. 2) of processing apparatus 100 and short-range radio communication module 240 (see FIG. 3) of controller 200 may be located in a path of transmission of information from vibration generation control module 1106 to controller 200.

In controller 200, controller control unit 202 includes drive signal generation module 2021 as a part of its function. Drive signal generation module 2021 may be implemented by execution of a program by a processor, execution of firmware by a microcontroller including a hardwired circuit, or a dedicated semiconductor such as an application specific integrated circuit (ASIC). A known technique in accordance with each age can be adopted as a method of mounting controller control unit 202 including drive signal generation module 2021.

Drive signal generation module 2021 generates a drive signal based on information on a synthesized pattern from processing apparatus 100. In the present embodiment, since a synthesized pattern is designated with a frequency domain by way of example, drive signal generation module 2021 converts information in the frequency domain into a drive signal in a time domain. Processing for generating a drive signal in drive signal generation module 2021 will be described later. A drive signal output from drive signal generation module 2021 is given to vibration portion 220 of controller 200 and vibration portion 220 generates vibrations in response to the drive signal.

In game system 1 according to the present embodiment, information in a frequency domain (a frequency and an amplitude) is transmitted from processing apparatus 100 to controller 200 and converted into a drive signal in a time domain in controller 200. A necessary transmission band can advantageously be compressed by converting data exchanged between processing apparatus 100 and controller 200 into information in a frequency domain.

Without being limited to such a form, a drive signal in a time domain may be generated by processing apparatus 100 and transmitted to controller 200. Though a configuration in which a synthesis module is mounted on a side of processing apparatus 100 is exemplified in the description above, a synthesis module may be mounted on a side of controller 200. One or more vibration patterns may be transmitted from processing apparatus 100 to controller 200 and the side of controller 200 may perform processing for synthesizing vibration patterns or processing for generating a drive signal.

[F. Processing for Generating Drive Signal]

Processing for generating a drive signal in a time domain from a synthesized pattern designated by information in a frequency domain (a frequency and an amplitude) will now be described.

(f1: Generation Procedure)

Figure 20:
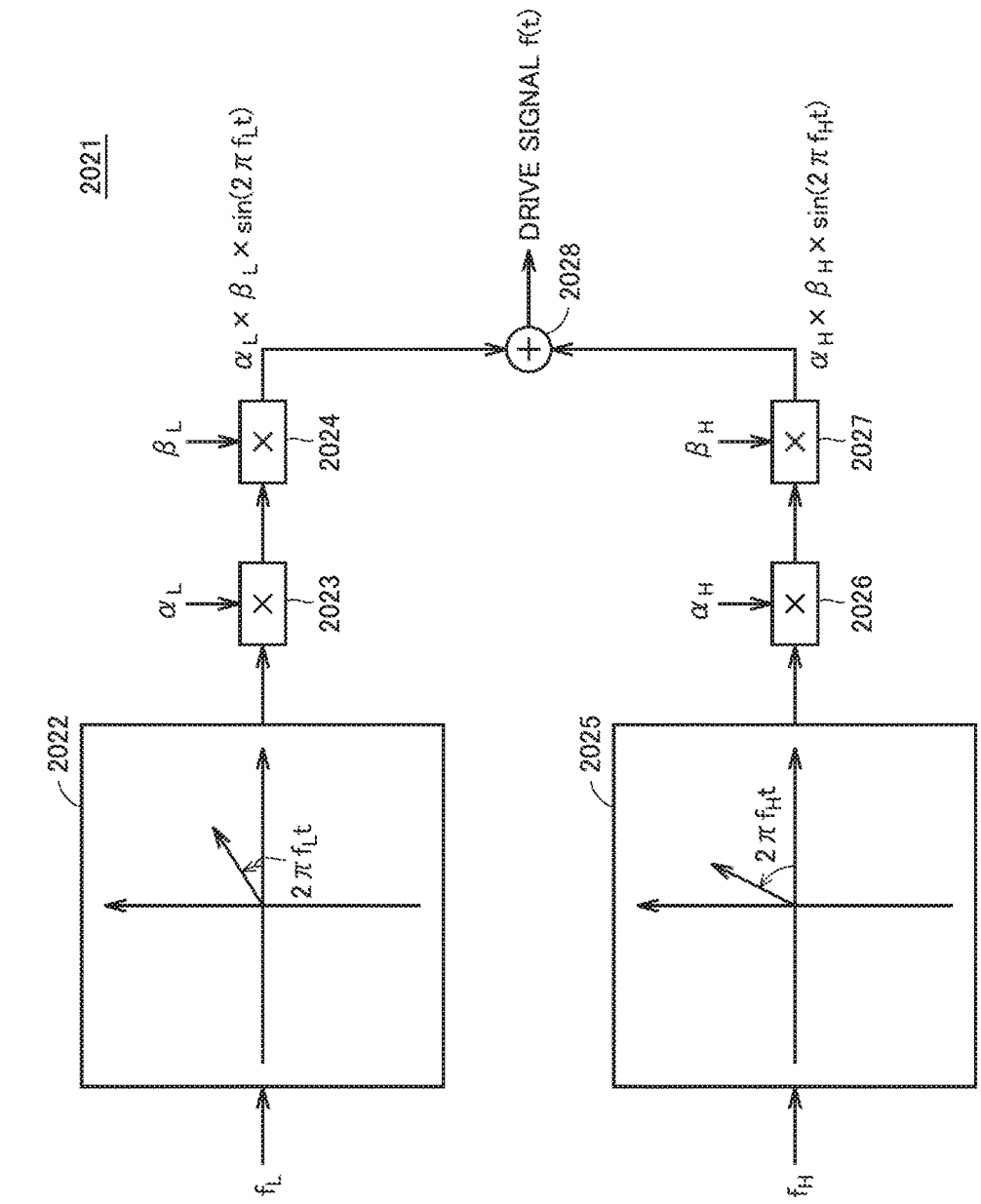
FIG. 20 shows an exemplary illustrative non-limiting drawing illustrating processing for generating a drive signal in the game system according to the present embodiment.

Processing for generating a drive signal in game system 1 according to the present embodiment will be described with reference to FIG. 20. FIG. 20 shows an example in which controller control unit 202 (to be more exact, drive signal generation module 2021) of controller 200 generates a drive signal.

Drive signal generation module 2021 receives information (frequency fL and amplitude αL in the low frequency band and frequency fH and amplitude αH in the high frequency band) designating a synthesized pattern from processing apparatus 100 and generates a drive signal in a time domain.

Drive signal generation module 2021 receives also correction coefficients βL and βH from processing apparatus 100. Correction coefficients βL and βH serve to adjust balance between vibrations in the low frequency band and vibrations in the high frequency band, and they are basically set to a value in a range of $0 < \beta L \leq 1$ and $0 < \beta H \leq 1$. Correction coefficients βL and βH are not essential features.

Drive signal generation module 2021 successively calculates $\alpha L \times \beta L \times \sin(2\pi \cdot fL \cdot t)$ as a component in the low frequency band of the drive signal and successively calculates $\alpha H \times \beta H \times \sin(2\pi \cdot fH \cdot t)$ as a component in the high frequency band of the drive signal. Then, the drive signal generation module outputs a result of synthesis of these components as a drive signal.

More specifically, drive signal generation module 2021 includes as its functions, phase determination modules 2022 and 2025, multiplication modules 2023, 2024, 2026, and 2027, and an addition module 2028. Each module included in drive signal generation module 2021 performs operation processing every prescribed operation period (for example, ¹⁄₄₀₀₀ sec.). As described above, in a configuration without correction coefficients βL and βH, multiplication modules 2024 and 2027 do not have to be provided.

Phase determination modules 2022 and 2025 calculate phase components (sin values at calculation timing) with calculation periods in accordance with frequencies fL and fH, respectively. Multiplication modules 2023 and 2026 multiply the phase components by amplitude components in accordance with amplitudes αL and αH, respectively. Multiplication modules 2024 and 2027 multiply results of multiplication by the amplitude components by correction coefficients in accordance with correction coefficients βL and βH, respectively. Addition module 2028 generates a drive signal f(t) by summing results of calculation in the low frequency and high frequency bands.

By adopting a calculation logic as shown in FIG. 20, a drive signal in accordance with a synthesized pattern designated in a frequency domain can be generated.

As described above, a synthesized pattern is updated every prescribed period (for example, 5 msecs. to several ten msecs.). As a result of updating, a frequency and an amplitude defining a synthesized pattern are varied stepwise. Continuity of a time waveform of a drive signal may be kept against such stepwise variation. Processing for keeping continuity of a time waveform of a drive signal will be described below.

Figure 21A:
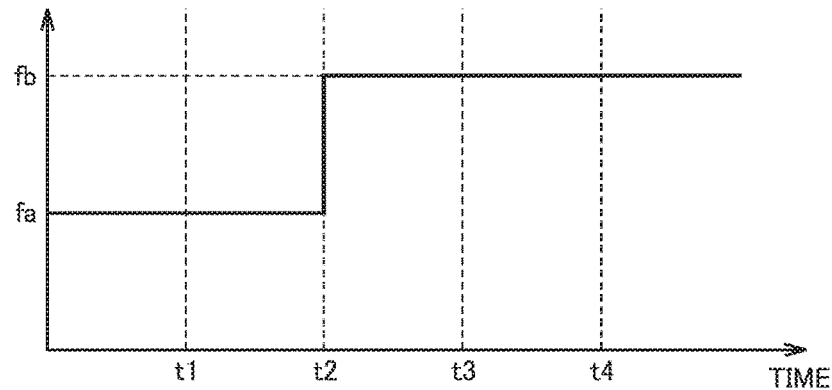
FIGS. 21A and 21B show exemplary illustrative non-limiting drawings illustrating processing for keeping continuity of a time waveform of a drive signal in the game system according to the present embodiment.

Processing for keeping continuity of a time waveform of a drive signal in game system 1 according to the present embodiment will be described with reference to FIGS. 21A and 21B. FIG. 21A shows one example of a time waveform of a phase of a synthesized pattern. In the synthesized pattern shown in FIG. 21A, a frequency fa is indicated in a section from a reference time to time t2, and a frequency fb is indicated at time t2 or later. At time t2, a frequency is varied stepwise from fa to fb.

Figure 21B:
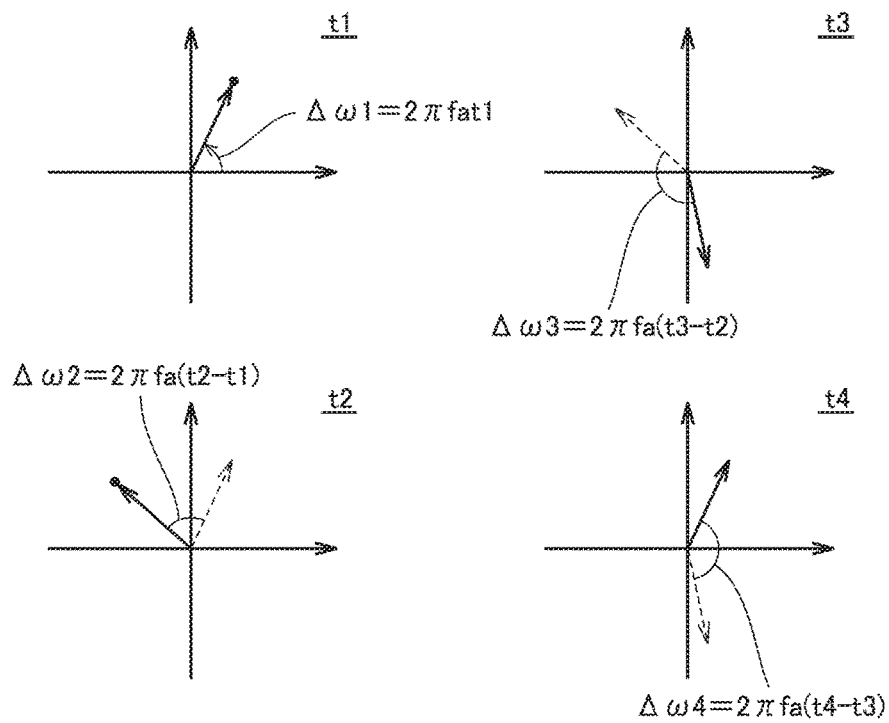

FIG. 21B shows a method of calculating a phase component at each of times t1 to t4 shown in FIG. 21A. At time t1, a displacement angle Δω1 is calculated from frequency fa and a length of time from the reference time to time t1 with an initial position (phase zero) being defined as the reference, and a phase component is calculated based on an angle resulting from addition of displacement angle Δω1 to the reference angle.

At subsequent time t2, with the phase at time t1 being defined as the reference, a displacement angle Δω2 is calculated from frequency fa and a length of time from time t1 to time t2 and a phase component is calculated based on an angle resulting from addition of displacement angle Δω2 to the angle at time t1.

At subsequent time t3, similarly, a phase component is calculated with the phase at previous time t2 being defined as the reference. Since magnitude of a designated phase has varied, a varied phase fb is employed. Specifically, with the phase at time t2 being defined as the reference, a displacement angle Δω3 is calculated from frequency fb and a length of time from time t2 to time t3 and a phase component is calculated based on an angle resulting from addition of displacement angle Δω3 to the angle at time t2.

At subsequent time t4, with the phase at time t3 being defined as the reference, a displacement angle Δω4 is calculated from frequency fb and a length of time from time t3 to time t4 and a phase component is calculated based on an angle resulting from addition of displacement angle Δω4 to the angle at time t3.

As shown in FIG. 21B, at each timing of calculation of a drive signal, a present phase is calculated with a phase calculated at previous calculation timing being defined as the reference and then a phase component is output. By adopting such a method of sequentially adding an amount of phase increased from the previous calculation timing, continuity of a time waveform of a drive signal can be kept even though a phase designating a synthesized pattern is updated stepwise at any timing.

Figure 22:
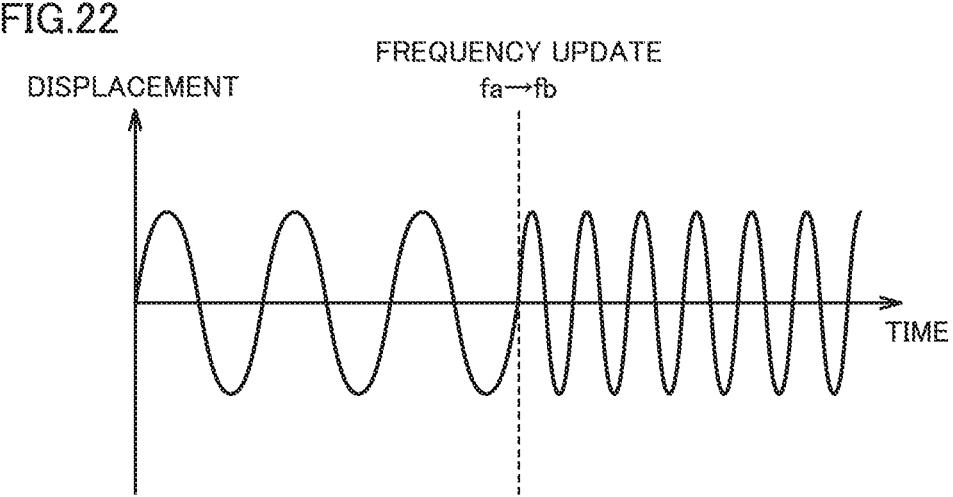
FIG. 22 shows an exemplary illustrative non-limiting drawing illustrating a time waveform of a drive signal generated in the game system according to the present embodiment.

FIG. 22 shows one example of a time waveform of a drive signal generated in game system 1 according to the present embodiment. Though FIG. 22 shows an example in which a frequency of a synthesized pattern is updated from fa to fb at a certain time, it can be seen that continuity of a time waveform of a drive signal is kept also by updating of the frequency.

(f2: Mount Example)

Processing for calculating a phase component as shown in FIGS. 20, 21A, and 21B can be performed with an arithmetic technique. More specifically, a phase component can sequentially be calculated with a trigonometric function and an inverse function thereof. Though such a calculation method may be adopted, calculation processing may be complicated and hence a calculation method using a table as exemplified below may be adopted.

Processing for generating a drive signal with a reference table in game system 1 according to the present embodiment will be described with reference to FIG. 23. A reference table 2029 includes an addressed sequence and each column stores a rad value and a corresponding sin value. The rad value is arranged to monotonously increase in a prescribed step. Reference table 2029 corresponds to conversion of a trigonometric function (that is, a sin function) into a table. A trigonometric function (a sin function or a cos function) does not necessarily have to be used as reference table 2029, and a periodic function should only be used. For example, a saw-tooth wave having a prescribed period may be adopted. Though FIG. 23 exemplifies reference table 2029 configured such that one period ($2\pi$ radians) is divided by 4096 and increment by $2\pi/4096$ radian is allowed, a resolution should only be designed as appropriate in accordance with performance or requirement of a system.

Processing for calculation of a phase component by phase determination modules 2022 and 2025 (FIG. 20) is performed by using reference table 2029. Specifically, a count value corresponding to a current phase is obtained ((1) in FIG. 23). In succession, a next count value is calculated based on a designated frequency of a synthesized pattern ((2) in FIG. 23). To how many counts a displacement angle $\Delta\omega$ shown in FIGS. 21A and 21B corresponds is calculated and a next count value is calculated by adding the calculated increment count to the current count value.

Then, a sin value corresponding to the calculated next count value is read ((3) in FIG. 23). The read sin value is defined as a phase component at next timing of calculation of a drive signal.

Similar processing is subsequently repeated. A count value after next is calculated based on a designated frequency of a synthesized pattern ((4) in FIG. 23). A sin value corresponding to the calculated count value after next is read ((5) in FIG. 23). The read sin value is defined as a phase component at timing after next of calculation of a drive signal.

By adopting such a form of mount with reference to reference table 2029, processing for calculating a sin value for calculating a phase component is no longer necessary, and basically, only a count value indicating a row to be referred to at each calculation timing should only be calculated. Therefore, even when a frequency is varied, continuity of a time waveform of a drive signal can be kept while computation cost is reduced.

(f3: Processing for Lessening Amount of Change)

FIGS. 21A and 21B described above show an example in which a frequency of a synthesized pattern is varied stepwise from fa to fb for the sake of convenience of description. In game system 1 according to the present embodiment, even when a frequency of a synthesized pattern is varied stepwise, continuity of a time waveform of a drive signal is kept by adopting the processing method as described above. A time waveform, however, may also significantly be distorted before and after stepwise variation. Therefore, processing for lessening an amount of change which may be produced in a time waveform may be adopted.

Figure 24A:
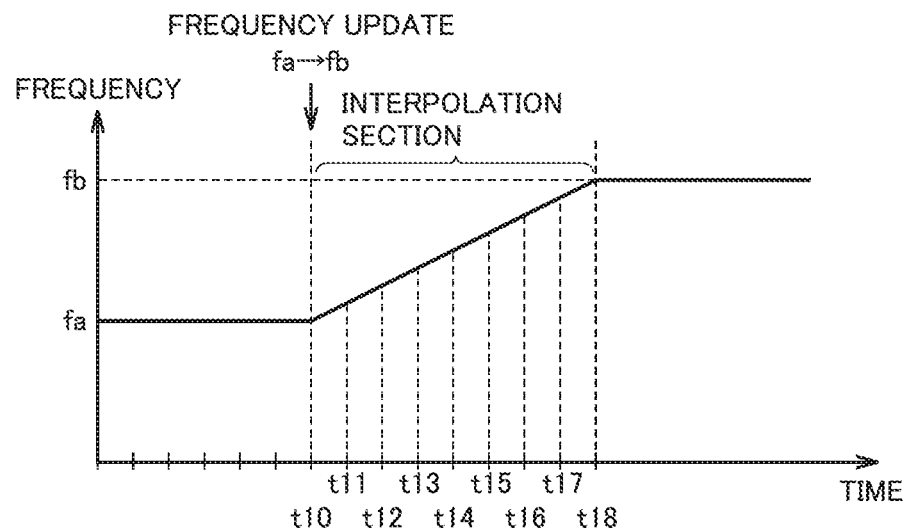
FIGS. 24A and 24B show exemplary illustrative non-limiting drawings illustrating processing for lessening an amount of change in the game system according to the present embodiment.
Figure 24B:
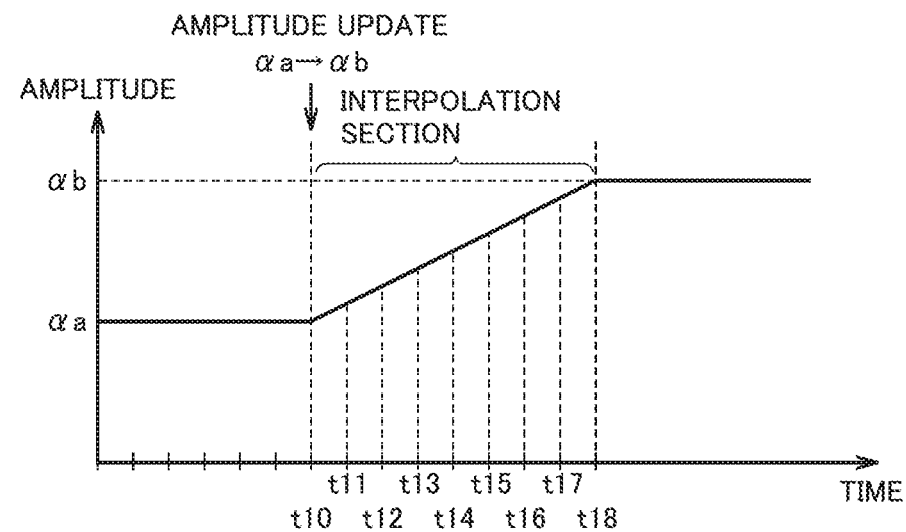

FIGS. 24A and 24B are diagrams for illustrating processing for lessening an amount of change in game system 1 according to the present embodiment. FIG. 24A shows an example in which a frequency of a synthesized pattern is varied from fa to fb and FIG. 24B shows an example in which an amplitude of a synthesized pattern is varied from $\alpha a$ to $\alpha b$.

As shown in FIG. 24A, it is assumed that a frequency of a synthesized pattern is updated from fa to fb at time t10. In this case, it is assumed that a frequency is varied from fa to fb with a certain period (an interpolation section) being spent. Change over time from frequency fa to fb may be in any manner, and interpolation using a linear function or interpolation using a high-dimensional function may be applicable. FIGS. 24A and 24B show an example of interpolation using a linear function (linear interpolation) for the sake of convenience of description.

Times t10 to t18 shown in FIG. 24A correspond to timing of calculation of a drive signal. A generated drive signal is gradually varied by using interpolated characteristics in generating a drive signal at each calculation timing. An increment in phase calculated at each calculation timing is not varied stepwise at a certain time but gradually increased in accordance with the interpolated characteristics. By lessening such an amount of change in increment in phase, change over time which appears in a finally generated drive signal also changes from abrupt change to gradual change.

By adopting the processing for lessening an amount of change shown in FIG. 24A, possibility that a vibratory stimulus as not intended by an application developer is provided to a user can be suppressed.

The processing for lessening an amount of change is applicable also to stepwise variation in amplitude of a synthesized pattern in FIG. 24B, with the technique similar to that in FIG. 24A. By applying such processing for lessening an amount of change, possibility that a vibratory stimulus as not intended by an application developer is provided to a user can be suppressed.

Displacement in generated drive signal is determined by a product of a phase component and an amplitude. Therefore, even though an amplitude is varied stepwise, abrupt change over time does not necessarily appear in a generated drive signal. Therefore, the processing for lessening an amount of change does not have to be applied to both of a frequency and an amplitude.

As shown in FIGS. 24A and 24B, delay to some extent is caused after a value for a frequency and/or an amplitude is varied stepwise by the time the value is actually varied to the updated value. This delay, however, can sufficiently be little as compared with progress of game processing and it does not give rise to a practical problem.

In game system 1 according to the present embodiment, a vibratory stimulus is expressed with two combinations of a frequency and an amplitude. Therefore, the processing shown in FIGS. 24A and 24B may be applied for each combination. The processing for lessening an amount of change as shown in FIGS. 24A and 24B may be applied to each or only any one of the low frequency band and the high frequency band.

The interpolation processing as shown in FIGS. 24A and 24B may be mounted on the side of controller control unit 202 (to be more exact, drive signal generation module 2021) of controller 200 or on the side of processing apparatus 100. By mounting the processing on the side of controller 200, influence on a rate of communication between processing apparatus 100 and controller 200 can be suppressed.

[G. Form of Distribution of Program]

A form of distribution of a program including a synthesis module used for generating a synthesized pattern in game system 1 according to the present embodiment will now be described with reference to FIGS. 25A and 25B.

Figure 25A:
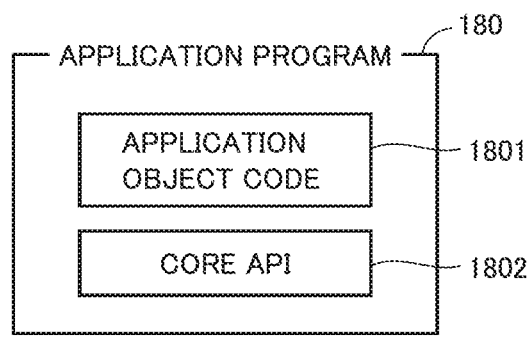
FIGS. 25A and 25B show exemplary illustrative non-limiting drawings illustrating a form of distribution of a vibration control program involved with control of the vibration portion in the game system according to the present embodiment.
Figure 25B:
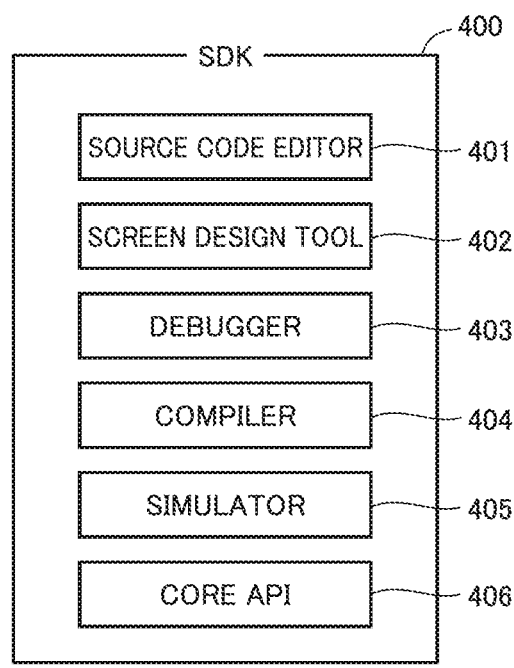

FIGS. 25A and 25B show one example of a form of distribution of a vibration control program involved with control of the vibration portion in game system 1 according to the present embodiment. FIG. 25A shows an example in which a program module necessary for control of the vibration portion is mounted on a part of application program 180 as an application programming interface (API). FIG. 25B shows an example of distribution as a software development kit (SDK) including a program module necessary for control of the vibration portion.

In the description shown in FIGS. 25A and 25B, "API" means one or more program modules which can be made use of by any application program. Any form is applicable as a specific form of one or more program modules. Typical examples include a library, a sub routine, and an object class.

Referring to FIG. 25A, application program 180 (see FIG. 2) typically includes an application object code 1801 which is an entity of an application program and a core API 1802 made use of by application object code 1801 at the time of execution.

A synthesis module used for generating a synthesized pattern as described above may be included as a part of core API 1802. A developer of an application can mount generation of a synthesized pattern as described above by describing a declare statement and designation of a variable for making use of a synthesis module included in core API 1802 in a code of the application.

Referring to FIG. 25B, an SDK 400 provided to a developer of an application typically includes a source code editor 401, a screen design tool 402, a debugger 403, a compiler 404, a simulator 405, and a core API 406. Core API 406 may include a synthesis module used for generating a synthesized pattern as described above.

A developer of an application can install SDK 400 in processing apparatus 100 or a general-purpose computer and develop any application. The developer can readily mount a logic making use of a synthesis module used for generating a synthesized pattern as described above by using source code editor 401 to add description involved with use of any API included in core API 406, similarly to execution of a created application program in processing apparatus 100 when the application program is executed on simulator 405.

[H. Processing Procedure]

Figure 26:
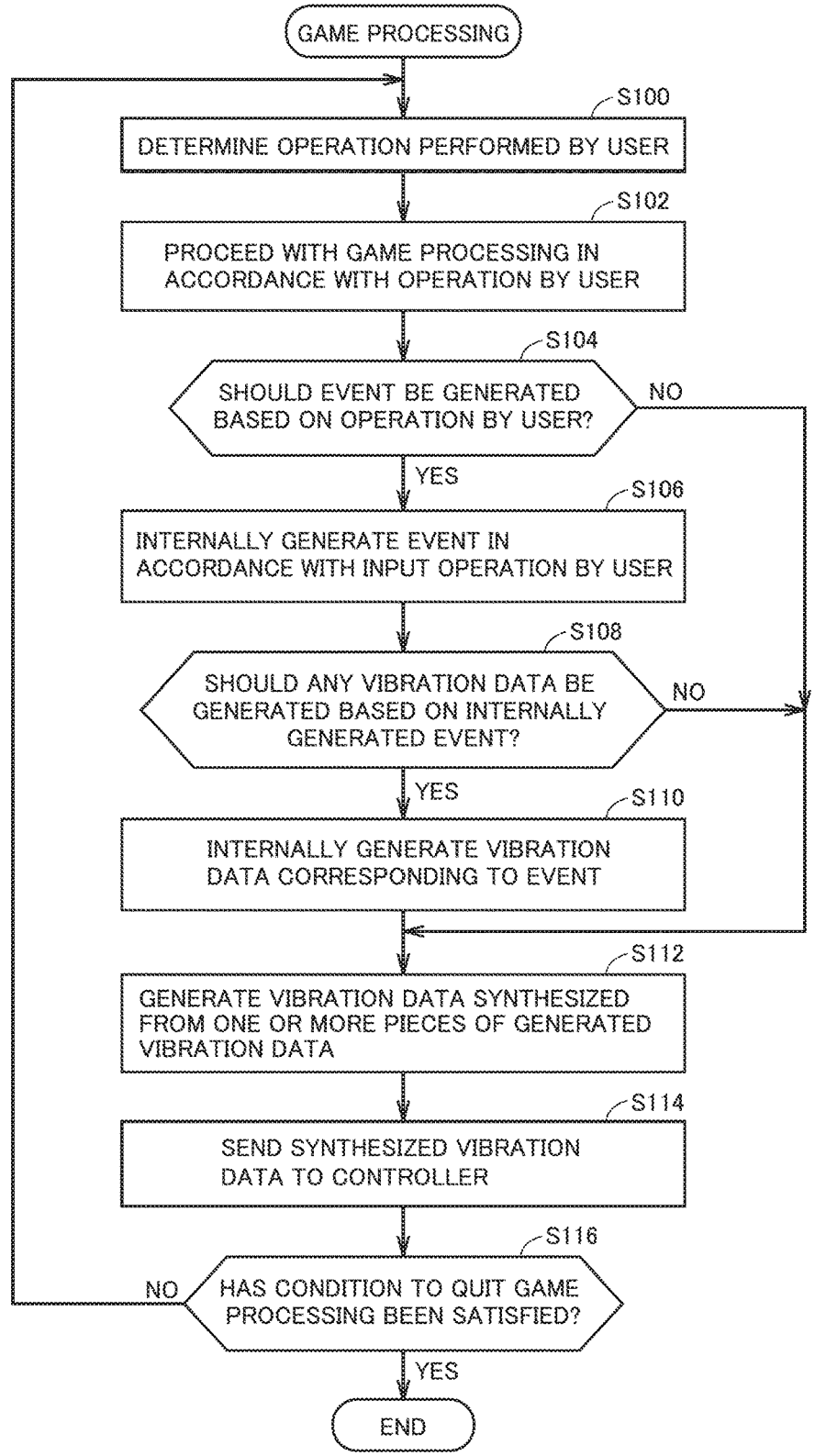
FIG. 26 shows an exemplary illustrative non-limiting flowchart illustrating a procedure of processing performed in the game system according to the present embodiment.

Processing performed in game system 1 according to the present embodiment will now be described with reference to FIG. 26. FIG. 26 is a flowchart showing a procedure of processing performed in game system 1 according to the present embodiment. Each step shown in FIG. 26 is typically performed by execution of a system program or an application program by CPU 102 of processing apparatus 100. The vibration control program according to the present embodiment corresponds to one or both of the system program and the application program.

Referring to FIG. 26, CPU 102 determines an operation performed by a user based on operation information indicating the operation by the user onto the operation portion of controller 200 and a result of detection by sensors 230 (see FIG. 3) of controller 200 (step S100). CPU 102 proceeds with game processing in response to the operation by the user determined in step S100 (step S102). The proceeding of the game processing includes processing for updating video images and sound to be output. Concurrently, CPU 102 determines whether or not an event should be generated based on the operation by the user determined in step S100 (step S104). When an event should be generated (YES in step S104), CPU 102 internally generates an event in accordance with an input operation by the user (step S106). In succession, CPU 102 determines whether or not some kind of vibration data should be generated based on the internally generated event (step S108).

When an event does not have to be generated (NO in step S104) or when some kind of vibration data does not have to be generated (NO in step S108), the process proceeds to step S112.

When some kind of vibration data should be generated (YES in step S108), CPU 102 internally generates vibration data corresponding to the event (step S110).

CPU 102 performs processing for synthesizing generated one or more pieces of vibration data as described above and generates synthesized vibration data (step S112). When only a single piece of vibration data has been generated, processing for synthesizing the vibration data is substantially skipped and one piece of generated vibration data is output. When a plurality of pieces of vibration data are generated, with designation of the selection scheme, any one piece of vibration data is output every prescribed period in accordance with the method described in d1 and d2. With designation of the addition scheme, synthesized data resulting from synthesis of a plurality of pieces of vibration data is output in accordance with the method described in d3 and d4.

Finally, CPU 102 sends the synthesized vibration data to controller 200 (step S114). Controller 200 generates a drive signal based on a command of the synthesized data from CPU 102 and drives vibration portion 220.

CPU 102 determines whether or not a condition for quitting game processing has been satisfied (step S116). For example, whether or not end of game processing has been indicated through an operation by the user is determined. When a condition for quitting game processing has not been satisfied (NO in step S116), processing in step S100 or later is repeated.

When a condition for quitting the game processing has been satisfied (YES in step S116), the game processing ends.

[I. Advantages]

In the game system according to the present embodiment, a synthesis module can be made use of in any application. According to the synthesis module, a plurality of pieces of vibration data are prepared and a degree of freedom in creating such an application as generating vibration data of a type in accordance with progress of a game (occurrence of an event brought about by an operation by a user) can be enhanced. When the synthesis module is operated with the selection scheme, vibration data greater in amplitude is preferentially output so that a vibratory stimulus in accordance with vibration data most in conformity with an intention of an application developer can be provided to the user as the game proceeds. By operating the synthesis module with the addition scheme, the synthesis module is applicable also to such a scene that a vibratory stimulus which is combination of a plurality of pieces of vibration data is desirably provided to a user.

The synthesis module according to the present embodiment thus achieves an advantage to enhance a degree of freedom of an application developer in each of the selection scheme and the addition scheme and the degree of freedom can further be enhanced because selection from these schemes can arbitrarily be made.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A vibration control system for a hardware terminal, comprising:
    a first vibration command generator that generates first vibration data defined by a combination of a first frequency and a first amplitude;
    a second vibration command generator that generates second vibration data defined by a combination of a second frequency and a second amplitude;
    a vibration data synthesizer that outputs third vibration data defined by a combination of a third frequency and a third amplitude when the first vibration data and the second vibration data are input; and
    a vibrator configured to cause the terminal to vibrate based on the third vibration data,
    the vibration data synthesizer being configured to:
        determine the third amplitude by adding the first amplitude and the second amplitude to each other, and
        determine the third frequency from the first frequency and the second frequency based on a computation involving the first amplitude and the second amplitude, such that the third frequency is within a range from the first frequency to the second frequency as the third frequency.

2. The vibration control system according to claim 1, wherein the third frequency is calculated as being a weighted arithmetic mean of the first frequency and the second frequency, the weighting being based on a weight coefficient dependent on the first amplitude and the second amplitude.

3. The vibration control system according to claim 1, wherein the third frequency is calculated as being a weighted geometric mean of the first frequency and the second frequency, the weighting being based on a weight coefficient dependent on the first amplitude and the second amplitude.

4. The vibration control system according to claim 1, wherein the third frequency is set as one of the first frequency and the second frequency, based on which of the first and second amplitudes is greater.

5. The vibration control system according to claim 1, wherein the third frequency is calculated as being a median between the first frequency and the second frequency as the third frequency.

6. The vibration control system according to claim 1, wherein the third frequency is calculated as being a geometric mean of the first frequency and the second frequency.

7. The vibration control system according to claim 1, wherein the vibration data synthesizer is further configured to:
    set one of the first amplitude and the second amplitude as the third amplitude, and
    select, in response to a selection instruction, whether the third amplitude should be determined to be (a) the addition of the first and second amplitudes, or (b) one of the first and second amplitudes.

8. The vibration control system according to claim 7, wherein the first vibration command generator is further configured to generate, in addition to the first vibration data, fourth vibration data defined by a combination of a fourth frequency and a fourth amplitude,
    the second vibration command generator is further configured to generate, in addition to the second vibration data, fifth vibration data defined by a combination of a fifth frequency and a fifth amplitude, and
    the vibration data synthesizer is further configured to output sixth vibration data defined by a combination of a sixth frequency and a sixth amplitude in addition to the third vibration data when the fourth vibration data and the fifth vibration data are input in addition to the first vibration data and the second vibration data.

9. The vibration control system according to claim 8, wherein the vibration data synthesizer is configured to output the third vibration data from two pieces of vibration data of the first vibration data to the fourth vibration data and to output the sixth vibration data from two remaining pieces of vibration data in accordance with a frequency of input vibration data.

10. The vibration control system according to claim 1, wherein the first and second vibration command generators are configured to update vibration data in accordance with change per unit period in vibration waveform with which the terminal is to be vibrated.

11. The vibration control system according to claim 1, wherein the vibration data synthesizer is configured to accept as an input, vibration data output from another vibration data synthesizer.

12. The vibration control system according to claim 1, wherein the terminal includes a game progress processor configured to execute a game application,
    wherein the first and second vibration command generators are configured to generate vibration data in response to an event generated by the game progress processor.

13. The vibration control system according to claim 12, wherein
    the first vibration command generator is configured to generate the first vibration data in response to a first event generated by the game progress processor, and
    the second vibration command generation generator is configured to generate the second vibration data in response to a second event different from the first event.

14. The vibration control system according to claim 12, wherein the game progress processor is configured to generate the event in response to an operation by a user.

15. The vibration control system according to claim 1, wherein
    the first vibration data is generated to exhibit weak and continual vibrations, and
    the second vibration data is generated to exhibit strong and short vibrations.

16. The vibration control system according to claim 1, wherein
the vibrator has a plurality of resonance frequencies,
the terminal comprises the vibrator, and
the first frequency and the second frequency are set in accordance with the resonance frequencies of the vibrator.

17. An electronic device, comprising:
at least one processor and a memory;
a first vibration command generator that generates first vibration data defined by a combination of a first frequency and a first amplitude;
a second vibration command generator that generates second vibration data defined by a combination of a second frequency and a second amplitude;
a vibration data synthesizer that outputs third vibration data defined by a combination of a third frequency and a third amplitude when the first vibration data and the second vibration data are input; and
a vibrator configured to cause the electronic device to vibrate based on the third vibration data,
the vibration data synthesizer being configured to:
determine the third amplitude by adding the first amplitude and the second amplitude to each other, and
determine the third frequency as being within a range from the first frequency to the second frequency,
wherein the vibration data synthesizer determines the third frequency, from the first frequency and the second frequency, based on a relation between the first amplitude and the second amplitude.

18. A vibration control method comprising:
generating first vibration data defined by a combination of a first frequency and a first amplitude;
generating second vibration data defined by a combination of a second frequency and a second amplitude;
outputting third vibration data defined by a combination of a third frequency and a third amplitude when the first vibration data and the second vibration data are input; and
causing a terminal to vibrate based on the third vibration data,
the outputting third vibration data comprising
determining the third amplitude by adding the first amplitude and the second amplitude to each other, and
determining the third frequency from the first frequency and the second frequency based on a computation involving the first amplitude and the second amplitude, such that the third frequency is a frequency within a range from the first frequency to the second frequency.

19. The method according to claim 18, wherein the third frequency is calculated so as to be a weighted arithmetic mean or a weighted geometric mean of the first and second frequencies, the weighting being based on a a weight coefficient dependent on the first and second amplitudes.

20. The method according to claim 18, wherein the third frequency is set as one of the first frequency and the second frequency, based on which of the first and second amplitudes is greater.

21. The method according to claim 18, further comprising selecting, in response to a selection instruction, whether the third amplitude should be calculated as (a) the addition of the first and second amplitudes, or (b) one of the first and second amplitudes.

22. The method according to claim 18, wherein the first vibration data is generated to exhibit exhibits weak and continual vibrations, and the second vibration data is generated to exhibit exhibits strong and short vibrations.

23. A non-transitory computer-readable storage medium with an executable vibration control program stored thereon, the control program being executable by a processor of a terminal to cause the processor to perform functionality comprising:
generating first vibration data defined by a combination of a first frequency and a first amplitude;
generating second vibration data defined by a combination of a second frequency and a second amplitude;
outputting third vibration data defined by a combination of a third frequency and a third amplitude when the first vibration data and the second vibration data are input; and
causing a terminal to vibrate based on the third vibration data,
the outputting third vibration data comprising
determining the third amplitude by adding the first amplitude and the second amplitude to each other, and
determining the third frequency from the first frequency and the second frequency based on a computation involving the first amplitude and the second amplitude, such that the third frequency is a frequency within a range from the first frequency to the second frequency.

24. The non-transitory computer-readable storage medium according to claim 23, wherein the wherein the third frequency is calculated so as to be a weighted arithmetic mean or a weighted geometric mean of the first and second frequencies, the weighting being based on a a weight coefficient dependent on the first and second amplitudes.

25. The non-transitory computer-readable storage medium according to claim 23, wherein the third frequency is set as one of the first frequency and the second frequency, based on which of the first and second amplitudes is greater.

26. The non-transitory computer-readable storage medium according to claim 23, wherein the control program is further executable to perform functionality comprising selecting, in response to a selection instruction, whether the third amplitude should be determined to be (a) the addition of the first and second amplitudes, or (b) one of the first and second amplitudes.

27. The non-transitory computer-readable storage medium according to claim 23, wherein the first vibration data is generated to exhibit exhibits weak and continual vibrations, and the second vibration data is generated to exhibit exhibits strong and short vibrations.

* * * * *